(12) United States Patent
Musho et al.

(10) Patent No.: US 12,523,130 B2
(45) Date of Patent: Jan. 13, 2026

(54) GAS SPARGER HEAD FOR AIRLIFT GEOTHERMAL SYSTEMS

(71) Applicant: West Virginia University Board of Governors on Behalf of West Virginia University, Morgantown, WV (US)

(72) Inventors: Terence Musho, Bruceton Mills, WV (US); Nigel Clark, Morgantown, WV (US); Daniel Hand, Orlando, FL (US); Leland Mink, Worley, ID (US)

(73) Assignee: WEST VIRGINIA UNIVERSITY BOARD OF GOVERNORS ON BEHALF OF WEST VIRGINIA UNIVERSITY, Morgantown, WV (US)

( * ) Notice: Subject to any disclaimer, the term of this patent is extended or adjusted under 35 U.S.C. 154(b) by 140 days.

(21) Appl. No.: 18/074,145

(22) Filed: Dec. 2, 2022

(65) Prior Publication Data

US 2023/0175365 A1 Jun. 8, 2023

Related U.S. Application Data

(60) Provisional application No. 63/285,237, filed on Dec. 2, 2021.

(51) Int. Cl.
*E21B 43/12* (2006.01)
*F04F 1/20* (2006.01)
(Continued)

(52) U.S. Cl.
CPC ............. *E21B 43/122* (2013.01); *F04F 5/24* (2013.01); *F04F 1/20* (2013.01); *F24T 50/00* (2018.05); *Y02E 10/10* (2013.01)

(58) Field of Classification Search
CPC ........ E21B 43/122; E21B 43/162; F04F 5/24; F04F 1/20; Y02E 10/10; F24T 50/00
See application file for complete search history.

(56) References Cited

U.S. PATENT DOCUMENTS

| | | | | | |
|---|---|---|---|---|---|
| 857,768 | A | * | 6/1907 | Stirling | F04F 5/46 417/197 |
| 2,062,799 | A | * | 12/1936 | Scott | F04F 1/18 417/108 |

(Continued)

FOREIGN PATENT DOCUMENTS

| | | | | | |
|---|---|---|---|---|---|
| CN | 104220761 | A | * | 12/2014 | ............. G10K 15/04 |
| CN | 108980121 | B | * | 8/2019 | ................ F04F 5/24 |

(Continued)

OTHER PUBLICATIONS

Bubble rising velocity and bubble size distribution in columns at high pressure and temperature: From lab scale experiments to design parameters, Leonard, et. al. Jul. 10, 2021 (Year: 2021).*

(Continued)

*Primary Examiner* — Nathan C Zollinger
(74) *Attorney, Agent, or Firm* — Thomas | Horstemeyer, LLP

(57) ABSTRACT

Various examples are provided related to airlift pumping of downhole geothermal fluids. In one example, an airlift system includes a compressor; a gas sparger head in a wellbore of a geothermal well, and a pressure head recycle assembly. The sparger head produces artificial lift of the geothermal fluids by injecting a gas resulting in a difference in density downhole. The entrained gas can be extracted by the pressure head recycle assembly, compressed, and reinjected downhole. The geothermal fluid at the well head can be used in direct use applications or in a thermodynamic cycle to make shaft power. The gas sparger head can include a venturi shaped passage extending through the gas sparger head and a bubble orifice including gas orifices radially spaced about a narrow portion of the venturi shaped passage. The gas orifices can have a corresponding resonant chamber through which the gas (e.g., air) is provided.

14 Claims, 23 Drawing Sheets

(51) Int. Cl.
*F04F 5/24* (2006.01)
*F24T 50/00* (2018.01)

(56) References Cited

U.S. PATENT DOCUMENTS

| | | | | |
|---|---|---|---|---|
| 3,782,468 | A * | 1/1974 | Kuwada | F24T 10/17 166/267 |
| 4,017,120 | A * | 4/1977 | Carlson | E21B 43/122 299/5 |
| 4,059,156 | A * | 11/1977 | Berg | E21B 43/121 165/45 |
| 6,547,532 | B2 * | 4/2003 | Gonzalez | F04F 5/46 417/198 |
| 6,714,803 | B1 | 3/2004 | Mortz | |
| 8,596,989 | B2 * | 12/2013 | Badr | F04F 1/06 417/108 |
| 11,306,744 | B2 * | 4/2022 | Ahmed | F04F 5/24 |
| 11,845,043 | B2 * | 12/2023 | Tharp | B01F 23/231122 |
| 2002/0182084 | A1 * | 12/2002 | Gonzalez | E21B 43/124 417/54 |
| 2006/0076145 | A1 * | 4/2006 | Lembcke | E21B 43/122 166/372 |
| 2007/0095539 | A1 | 5/2007 | Posluszny et al. | |
| 2010/0292548 | A1 | 11/2010 | Baker et al. | |
| 2011/0190599 | A1 | 8/2011 | Wang et al. | |
| 2014/0356194 | A1 * | 12/2014 | Ahmed | F04F 1/18 417/65 |
| 2016/0120464 | A1 | 5/2016 | Lau et al. | |
| 2018/0015282 | A1 | 1/2018 | Waner et al. | |

FOREIGN PATENT DOCUMENTS

| | | | |
|---|---|---|---|
| FR | 2584771 | A1 * | 1/1987 |
| WO | 2018156967 | A1 | 8/2018 |

OTHER PUBLICATIONS

Turnquist, N., "High-Temperature-High-Volume Lifting for Enhanced Geothermal Systems," GE Global Research, Niskayuna, NY, Final Report, pp. 1-141, 2013.
Mink, et al., "Optimizatio of a Sparger Head for Airlift Pimping of Downhole Geothermal Fluids", ASME ES2021, Virtual, 2021.
International Search Report and Written Opinion dated Feb. 16, 2023 for PCT Patent Application No. PCT/US2022/78102.

* cited by examiner

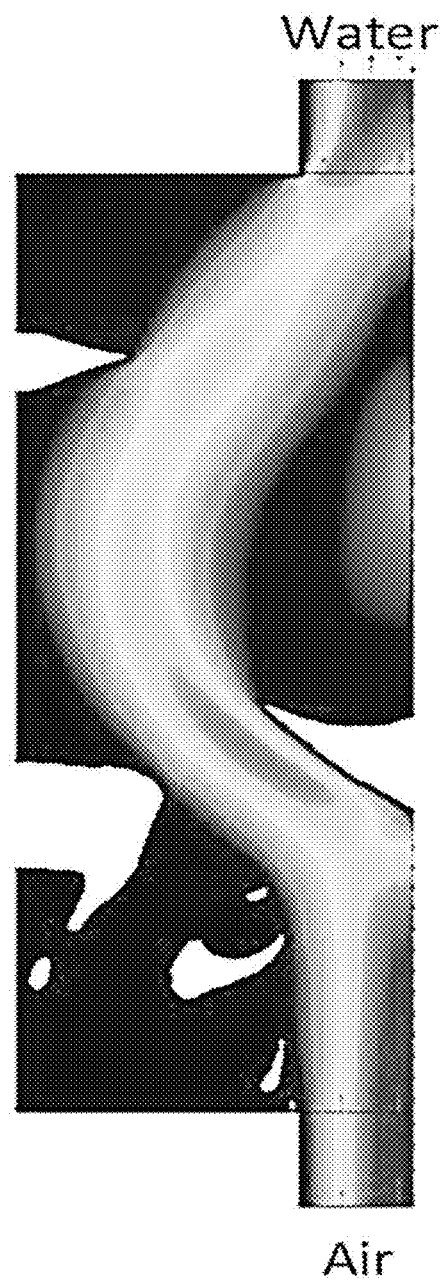 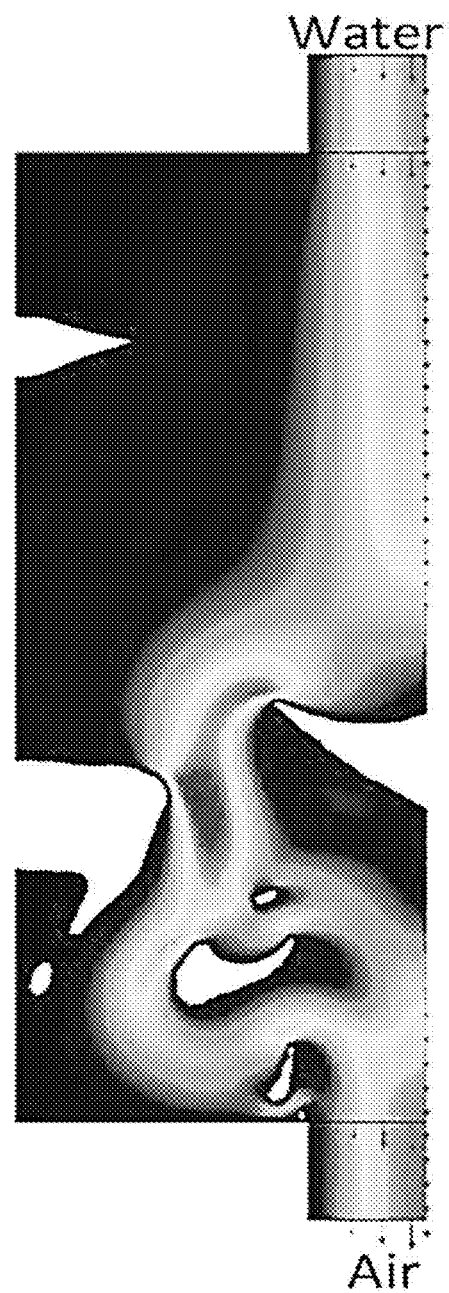 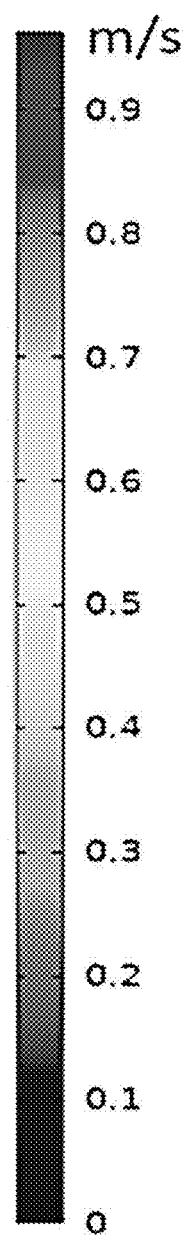
FIG. 4A      FIG. 4B

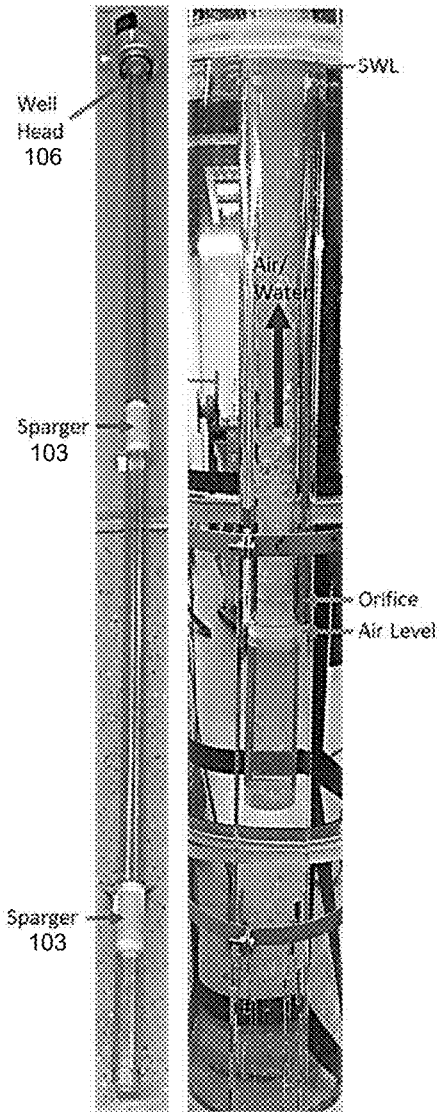
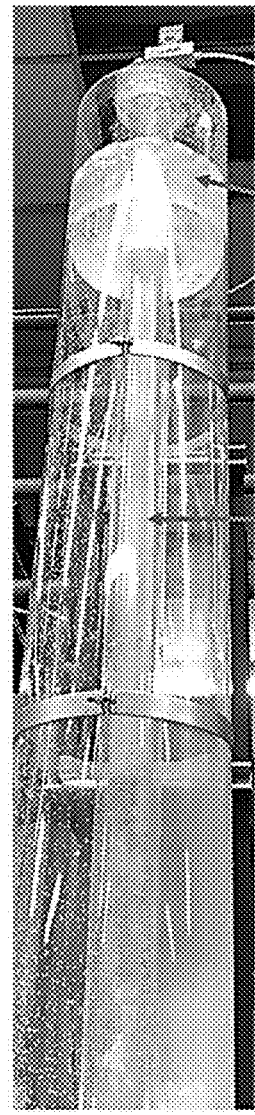
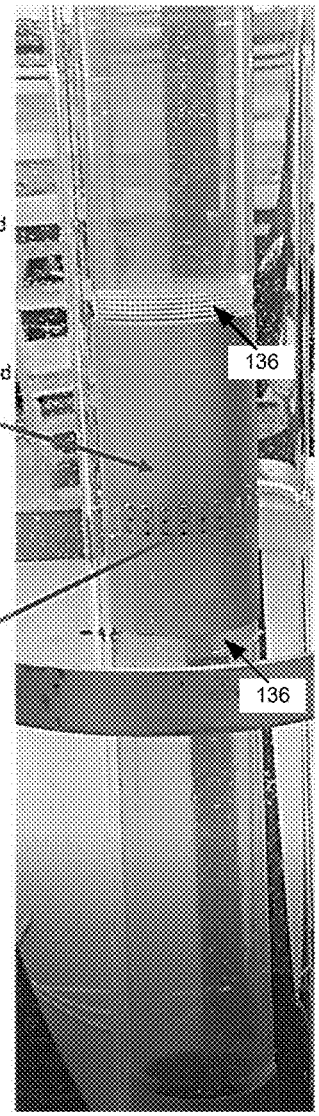
FIG. 6A  FIG. 6B  FIG. 6C  FIG. 6D

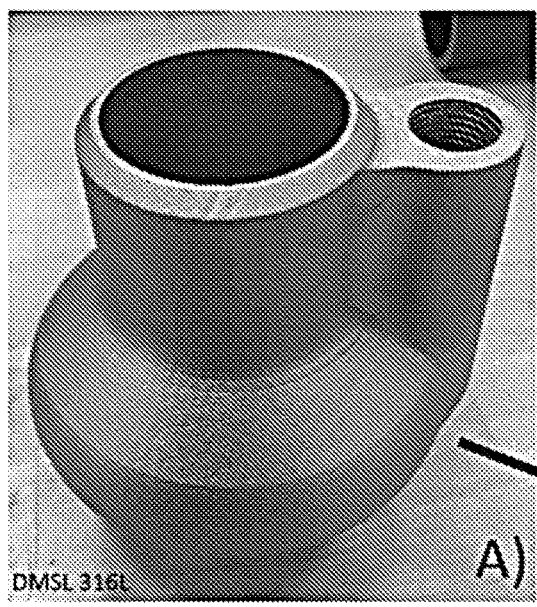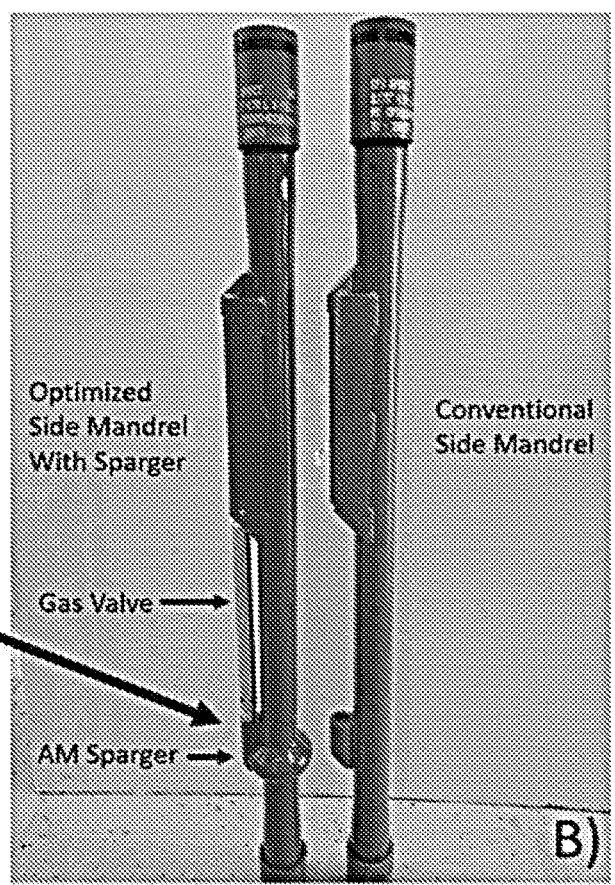
FIG. 12A
FIG. 12B

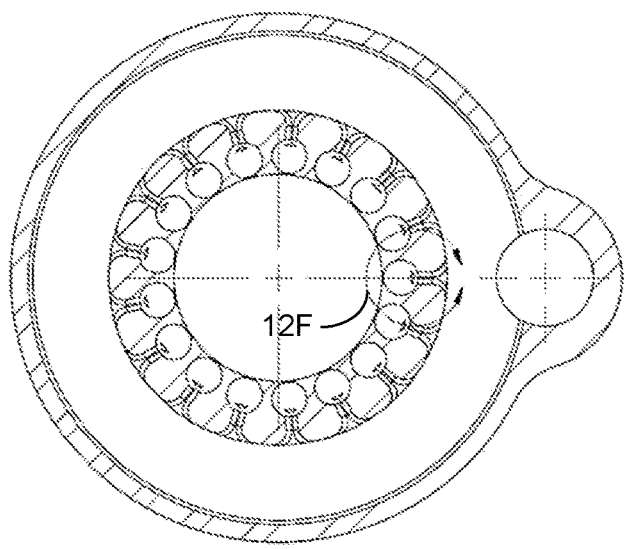
FIG. 12D
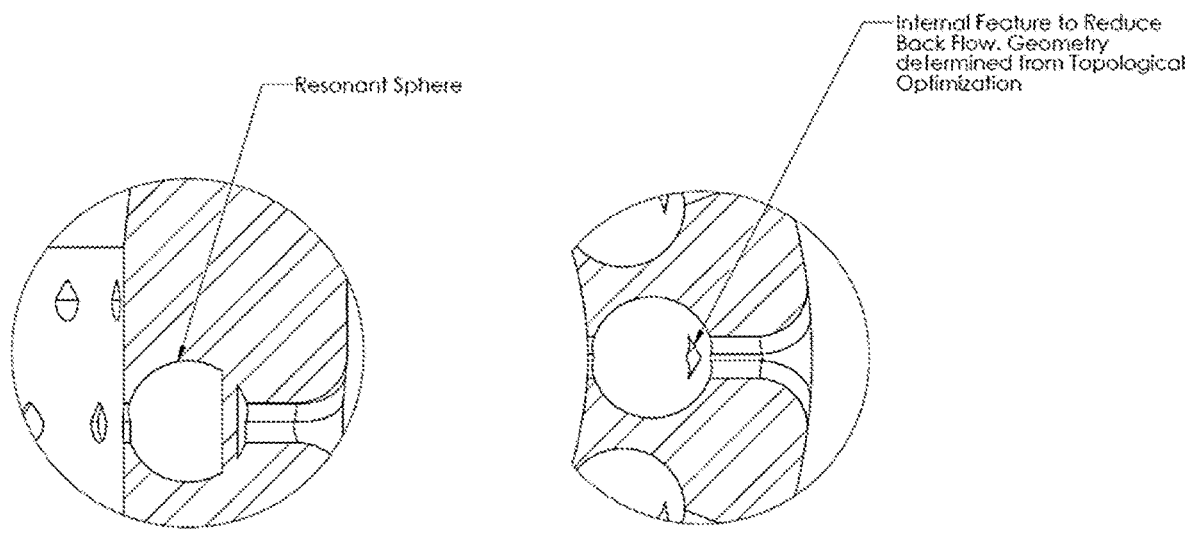
FIG. 12E  FIG. 12F

GAS SPARGER HEAD FOR AIRLIFT GEOTHERMAL SYSTEMS

CROSS REFERENCE TO RELATED APPLICATIONS

This application claims priority to, and the benefit of, U.S. provisional application entitled "Gas Sparger Head for Airlift Geothermal Systems" having Ser. No. 63/285,237, filed Dec. 2, 2021, which is hereby incorporated by reference in its entirety.

BACKGROUND

A line shaft pump (LSP) or electrical submersible pump (ESP) is used to lift geothermal fluids from downhole. These downhole pumps operate in an environment that is extremely hostile (high temperature, corrosive, scaling) to mechanical and electrical hardware. LSPs are used in mid- to high-range temperature geothermal wells and typically limited to less than 250 meters depth. While the electric motor of LSPs is located at the well head surface; the other moving parts (line shaft and pump) are in the geothermal environment, LSPs fail due to corrosion and abrasion failures. After failure, LSPs require long maintenance periods to remove the pumps from well. ESPs are typically used at depths greater than 250 meters but are restricted to lower temperature geothermal wells because of electrical components within pump. While more efficient than LSPs, ESPs typically fail due to corrosion failure of electrical line and pump components and abrasion failures.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A and 4B illustrate an example of topological optimization of the gas sparger head nozzle orifice, in accordance with various embodiments of the present disclosure.

FIG. 6A-6D illustrate an example of a test setup of the fabricated sparger head, in accordance with various embodiments of the present disclosure.

FIGS. 12A-12F illustrate an example of a downhole gas sparger, in accordance with various embodiments of the present disclosure.

DETAILED DESCRIPTION

Figure 1:
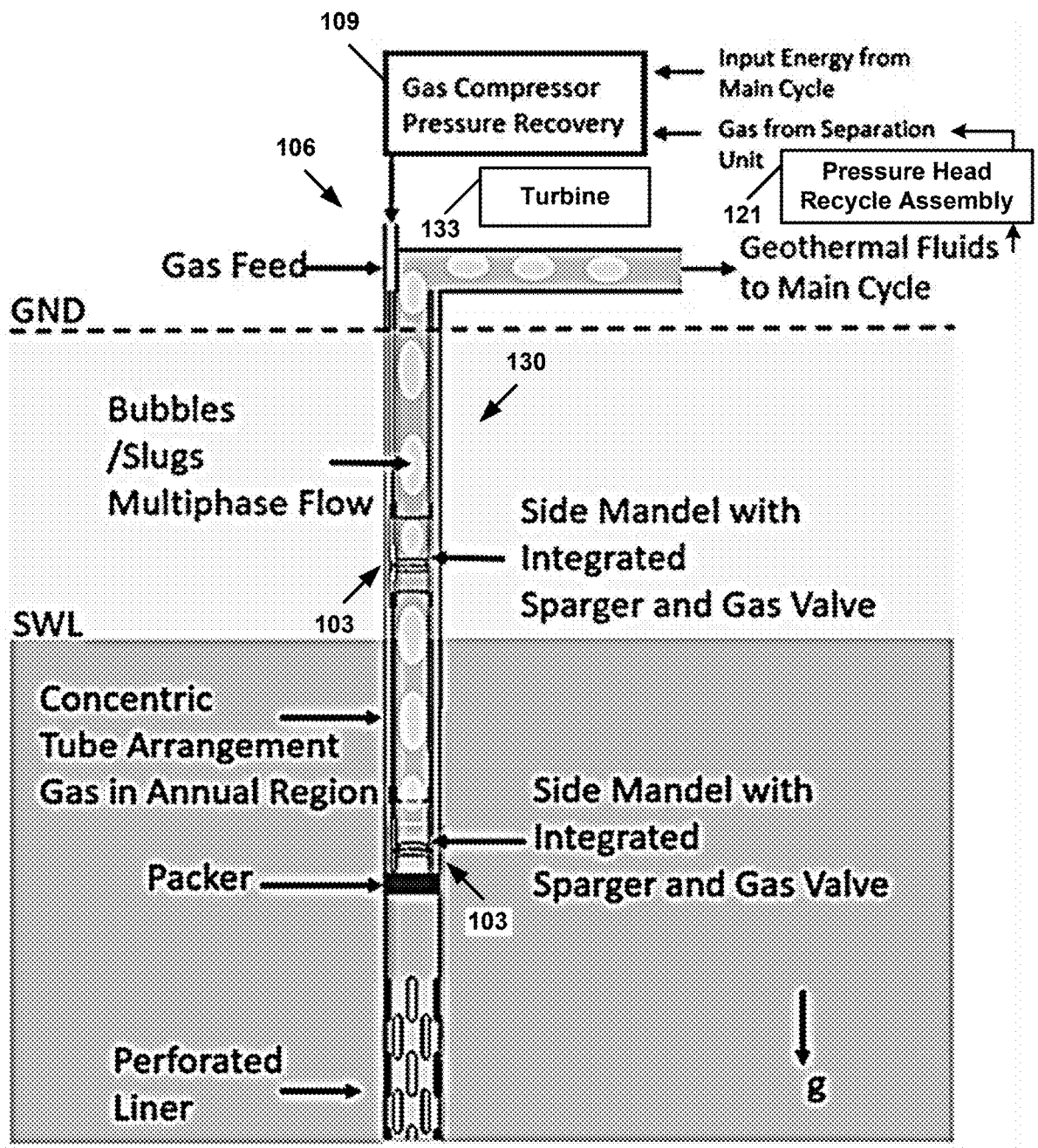
FIG. 1 illustrates an example of an airlift system with a downhole gas sparger head supplied by a pressure head recovery compressor, in accordance with various embodiments of the present disclosure.

Disclosed herein are various embodiments of methods related to airlift pumping of downhole geothermal fluids. Reference will now be made in detail to the description of the embodiments as illustrated in the drawings, wherein like reference numbers indicate like parts throughout the several views.

The issues with the pumping of geothermal fluids are well known in the industry. It is very typical for a geothermal well pump to have 5-20 stages, and to operate in hostile (hot and corrosive) conditions. The term "geothermal well" includes all wells (such as, e.g., traditional water wells) with a vertical lift. Pumps have been designed that operate in temperature environments up to 250° C. for up to 3 years. These are normally ESPs made from exceptionally expensive hardware. Predictably, these pumps are very expensive (more than $1 million per pump) and the cost of setting/maintaining the pumps only adds to the cost. An airlift approach offers a simple, cost effective, more robust solution that avoids the downhole issues while promising to achieve similar or better efficiency and longevity.

An airlift approach can be utilized to access deeper and hotter geothermal fluids and decrease the maintenance cost of existing LSP and ESP approaches. By replacing and/or supplementing existing pumping strategies with the gas sparger head, geothermal fluids that may not be accessible or economical using traditional extraction methods may be efficiently extracted. Existing pumps (LSP or ESP) are complicated, expensive, inefficient (with an overall system efficiency of 55% or less) and have relatively short operating lives (about 3 years). Injecting gas within the well from a gas sparger head can improve operations while avoiding the corrosive and abrasive failures by using a single component with no moving parts. Use of one or more sparger heads in lower and higher temperature wells can provide higher flow rates and/or access to deeper geothermal reservoirs. Multiple sparger heads located at different levels within the well can allow access to geothermal fluids at any drillable depths. The disclosed airlift technology offers a simple, cost effective, more robust solution that avoids downhole issues while achieving similar or better efficiency (e.g., an overall pumping efficiency of at least 60%) and longevity compared to traditional competing solutions.

Figures 2A, 2B:
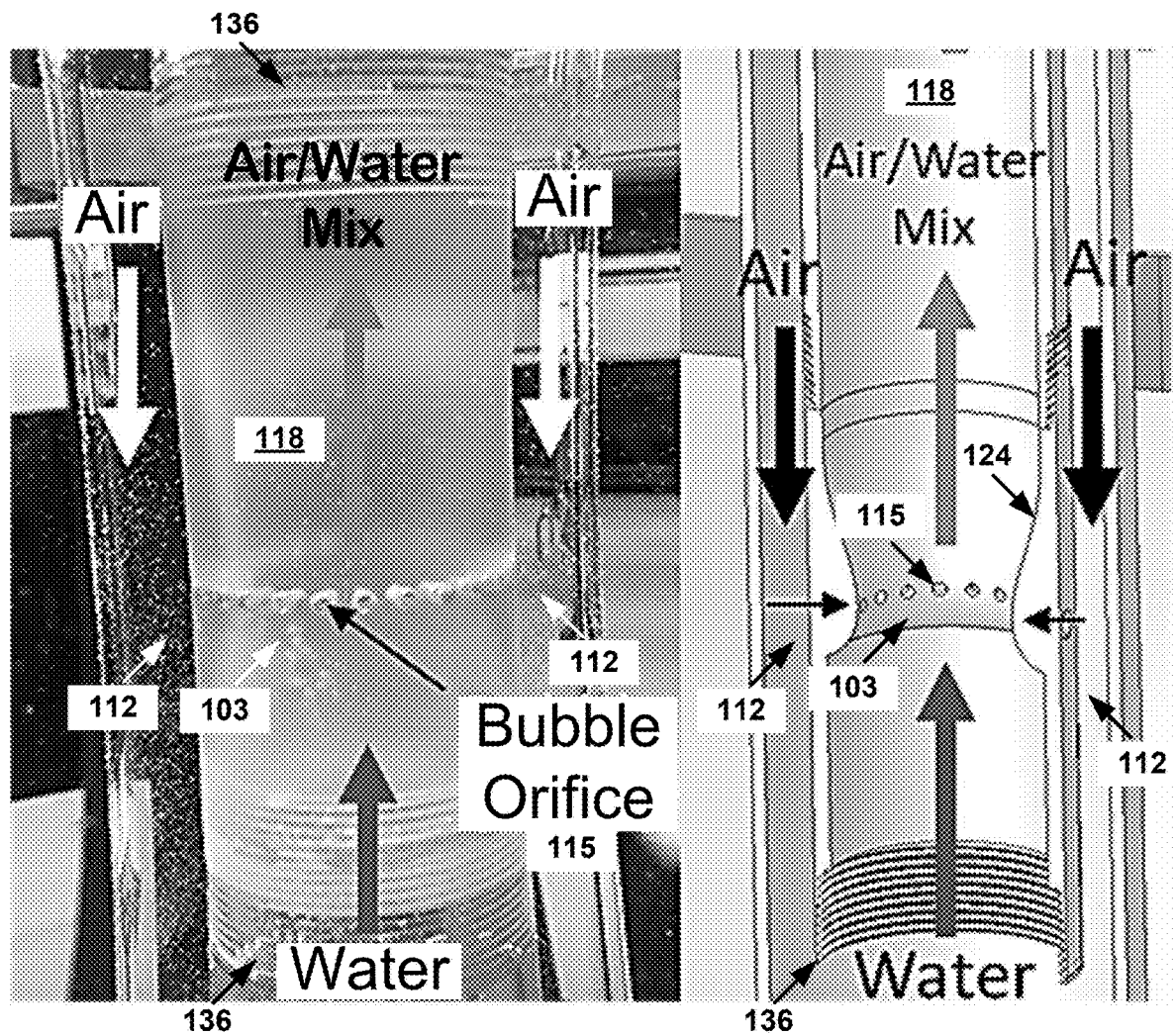
FIGS. 2A-2C illustrate an example of a gas sparger head design, in accordance with various embodiments of the present disclosure.
Figure 2C:
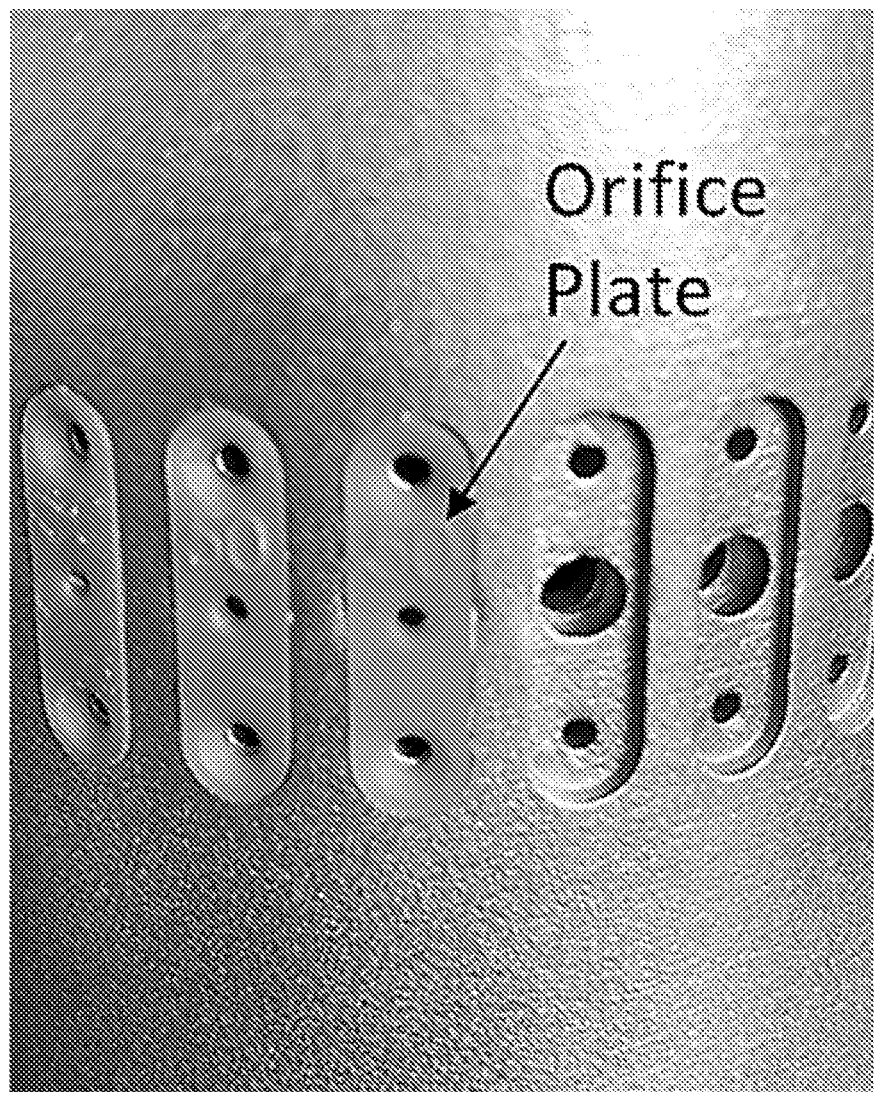

Existing geothermal airlift strategies simply blow air through a pipe inserted to a depth, and exhaust at atmospheric pressure. Here, a novel airlift system is presented that includes a gas sparger head that effectively generates and distributes bubbles to lift the geothermal fluid and a pressure head recovery cycle with no moving parts in the well. The gas sparger head can be optimized to create well-defined bubbles with a resonance release to lift the geothermal fluids to the surface with the highest possible efficiency. FIG. 1 illustrates an example of the airlift system with the gas sparger head (first sparger) 103 located downhole and a second stage gas sparger head 103 located above. At the wellhead 106, air can be compressed (by compressor 109) and feed down to the gas sparger head 103 through an air feed. FIG. 2A shows an example of a gas sparger head 103, which can be optimized with advanced simulation tools and fabricated using additive manufacturing (AM) with 3D printing. FIGS. 2A and 2B illustrate the concentric arrangement of the annual air feed line (outer annular area) 112, the annular orifices 115, and the inner pipe (central pipe) 118 in which the air/water bubbly mixture moves upward. The bubbles formed at the sparger head 103 force the geothermal fluids upward through the center pipe 118 to the well head 106 (FIG. 1) for use by the main cycle (pressure head recycle assembly 121). At the wellhead 106, a gas recovery cycle (pressure head recycle assembly 121) removes the lifting gas for reuse at wellhead pressure, improving the overall efficiency of the process. FIG. 2C illustrates the placement of an orifice plate on the outside of the sparger. The orifice size on the plate is fabricated to achieve the embodiments.

The airlift technology lifts the geothermal fluid through the interaction of the geothermal reservoir, gravity, and viscous forces between the injected air and the geothermal fluid. The air and geothermal fluid form a mixture of reduced density with upward momentum in the well. This raises the water level in the well and, with sufficient airflow, induces flow from the well. The flow is driven by the reservoir pressure. This airlift technology allows the operation of a pressurized well to control bubble size, with the recovery of air pressure at the wellhead to aid reinjection. With optimized air injection, bubble formation, resonance bubble release, and pressure recovery, airlift technology has the potential to outperform other extraction methods such LSP and ESP approaches.

The simplicity of the airlift technology is compelling. There are no moving parts downhole and the energy is supplied to the system from the surface by conventional compressors that can be readily serviced. Backup systems can be used to avoid down time. The sparger head can be removed in a fraction of the time needed to extract LSPs or ESPs. The airlift geothermal system can operate at any temperature and any depth by controlling the bore pressure and density. Airlift can work for any temperature since the control of well pressure can prevent flashing. Although simple in concept, the airlift benefits from a well-considered design of the sparger. Computer-aided design and additive 3D printing can be used to optimize the airlift approach, starting with bubble dynamics (resonant release) and efficient bubble geometry and placement in the sparger head, controlling well pressure, and recovering excess pressure energy at the surface. This solution is significantly less expensive than downhole pumps, more reliable with the elimination of downhole moving parts, and can perform at any temperature where pumps are temperature limited (e.g., up to 300° C.).

Generating a bubble efficiently is heavily influenced by the sparger geometry. By designing a sparger geometry that is optimized at generating bubbles, the overall efficiency of the airlift approach is increased. The geometry, as illustrated in FIGS. 10A-B, 11A-B, and 12C-12F includes a combination of internal and external features, all of which can take advantage of the AM fabrication process. In particular, complex internal features can be enabled by this manufacturing process. Gas sparger head internal features, which affect the resonance of the bubble generation, have very precise geometries that would be challenging to manufacture with conventional manufacturing or casting processes. Moreover, each sparger head can be tailored for given well characteristics. These characteristics can include, e.g., depth, reservoir productivity, casing diameter, temperature, etc.

FIGS. 2A-2B illustrate an example of a gas sparger head design for efficient bubble generation downhole as illustrated in FIG. 1. FIG. 2B provides a detailed view of the sparger head design. As seen in FIGS. 10B, 11B, and 12D-12F, several external and internal geometries can be optimized using the 3D AM approach. Each sparger head and each stage can be tailored for each geothermal well application to maximize efficiency of the airlift approach.

There are several features that can be optimized as illustrated in FIGS. 2A-2C. First, the bubble orifice 115 can be placed in a radial orientation, resulting in efficient shearing of bubbles. Second, the external shape can be a venturi shape 124, which aids in shearing and causes low static pressure at the bubble orifice causing a pulling action to bubbles. The spherical region within the orifice entrance in FIG. 11B is a resonant chamber 127 (or sphere) that supports the resonant bubble release action. The internal region shown in FIG. 2C is an orifice plate for even distribution of pressure across all resonant chambers. Precise manufacturing of these internal geometries can impact efficient bubble generation. It will be shown that in the experimental section that this design (Version 2) provides a nine-fold improvement in efficiency over the baseline (Version 1). Multiple stages of spargers can be situated along the internal stringer as shown in FIG. 6A. Multiple spargers provide additional lift and reduce starting pressure.

Figure 10A:
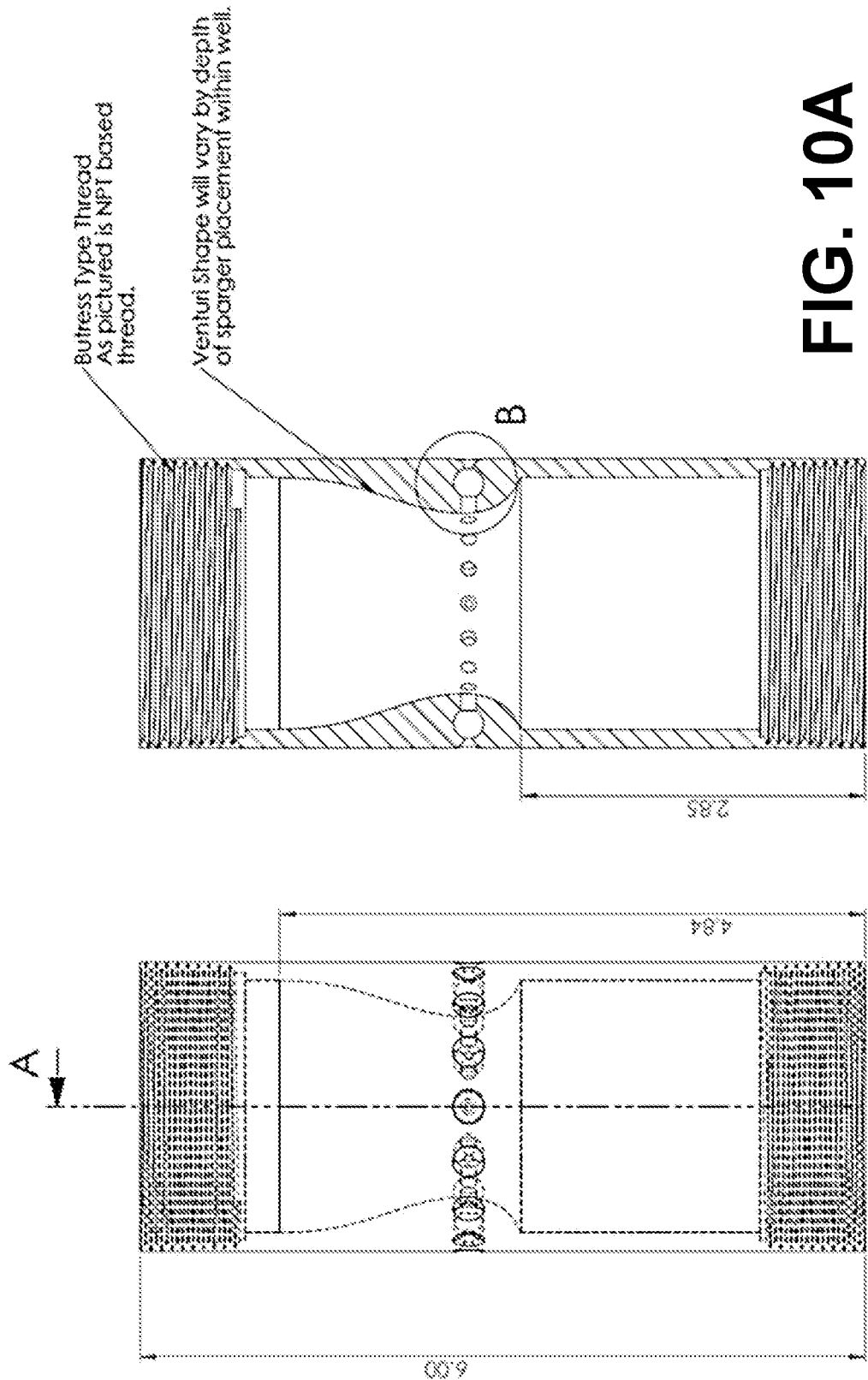
FIGS. 10A-10B and 11A-11B illustrate examples of gas sparger heads, in accordance with various embodiments of the present disclosure.
Figure 10B:
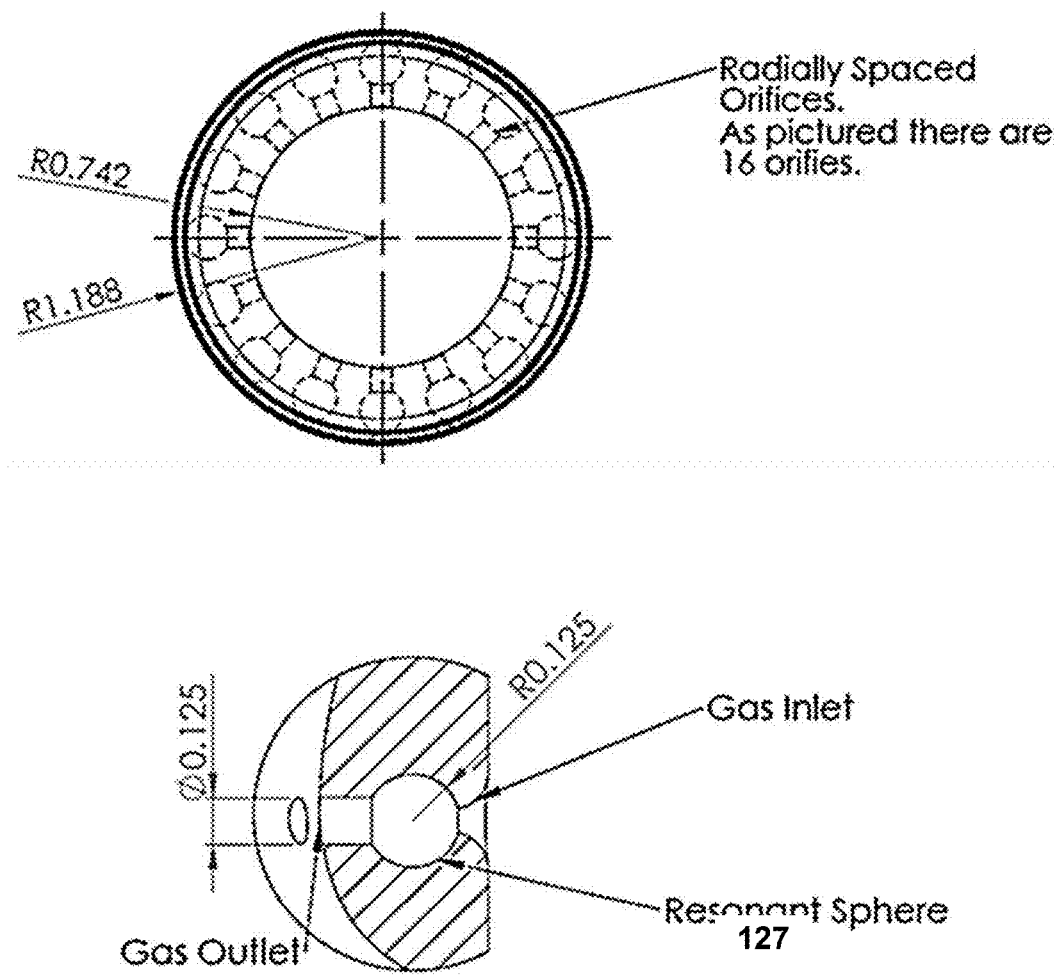

An additional aspect that was included in the design is the integration of the spargers along a single string as illustrated in FIG. 6A. The sparger is integrated onto the stringer pipe (or flow pipe) using a threaded (or welded) connection 136. The threaded connection on either end of the sparger allows multiple stages of spargers to be configured. FIGS. 10A and 10B illustrate the threaded connection on the sparger. The interface with stringer pipe is flush with both the internal and external faces of the sparger to mitigate friction flow losses.

Figure 3A:
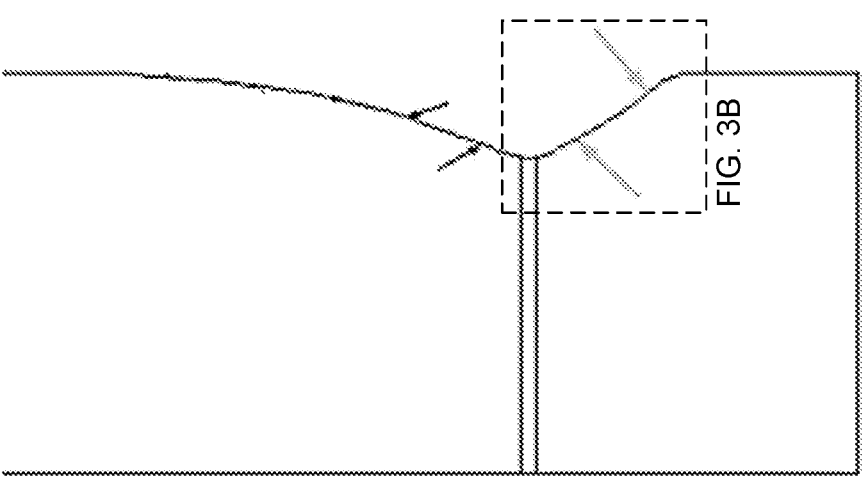
FIGS. 3A-3C illustrate an example of shape optimization of the gas sparger head design, in accordance with various embodiments of the present disclosure.
Figure 3B:
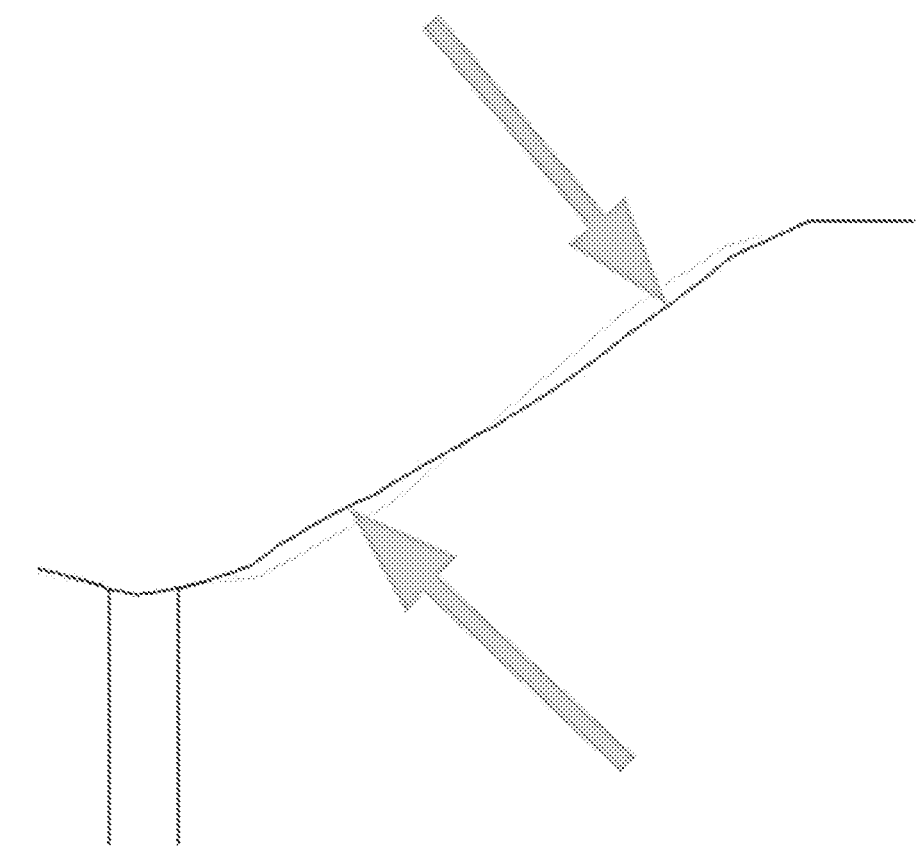
Figure 3C:
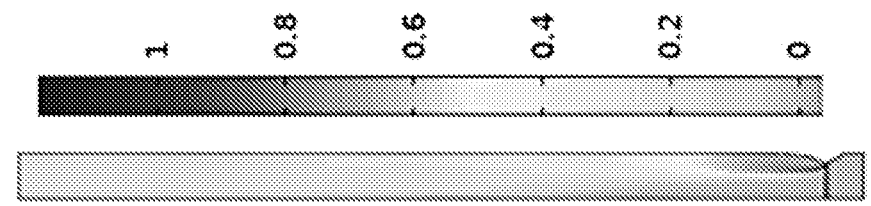

To aid in the design of the geometries, such as the venturi shape, multiphase flow analysis can be performed using, e.g., COMSOL Multiphysics with a shape and topological optimization technique. The software can be used to optimize the shape of the structure to achieve or maximize an objective function, such as the upward flowrate and minimize friction flow loss. FIGS. 3A-3C illustrate examples of results from a shape optimization study that was conducted. The vectors in FIGS. 3A and 3B represent the magnitude change in shape that the optimization routine determined. As shown in FIG. 3B, there was a modification of the inlet regions of the venturi to increase dynamic pressure at the bubble orifice. As indicated in FIG. 3A, the leeward side of the venturi was also smoothed out to increase bubble dispersion. The arrows in FIGS. 3A and 3B illustrate the change in shape from the dashed lines to the solid lines. FIG. 3C is an illustration of the final shape with the volume fraction of gas shown with contours. Note that the bubble concentration is high near the outside diameter.

Because of the resonant nature of the bubble formation at the bubble orifice, the orifice geometry discourages the backflow of water but allows the forward flow of air. FIG. 4 illustrates an example of the topological optimization of the nozzle geometry. A multiphase flow was simulated in both the forward and backward flow directions. FIG. 4A is a plot of the velocity contours when air is flowing from the bottom to the top. FIG. 4B is a plot of when water is flowing from the top to the bottom in the backflow direction. During the topological operation, the software was allowed to add and remove material to maximize the associated objective function. In this simulation, the objective was to minimize the pressure differential between the inlet and outlet in the forward direction and to maximize the pressure loss in the reverse flow direction. Note the tortuous path the water must take in FIG. 4B when water is flowing in the reverse direction compared to FIG. 4A when air is flowing in the forward direction. The design exhibited three times the pressure drop in the backflow direction.

Figures 5A, 5B:
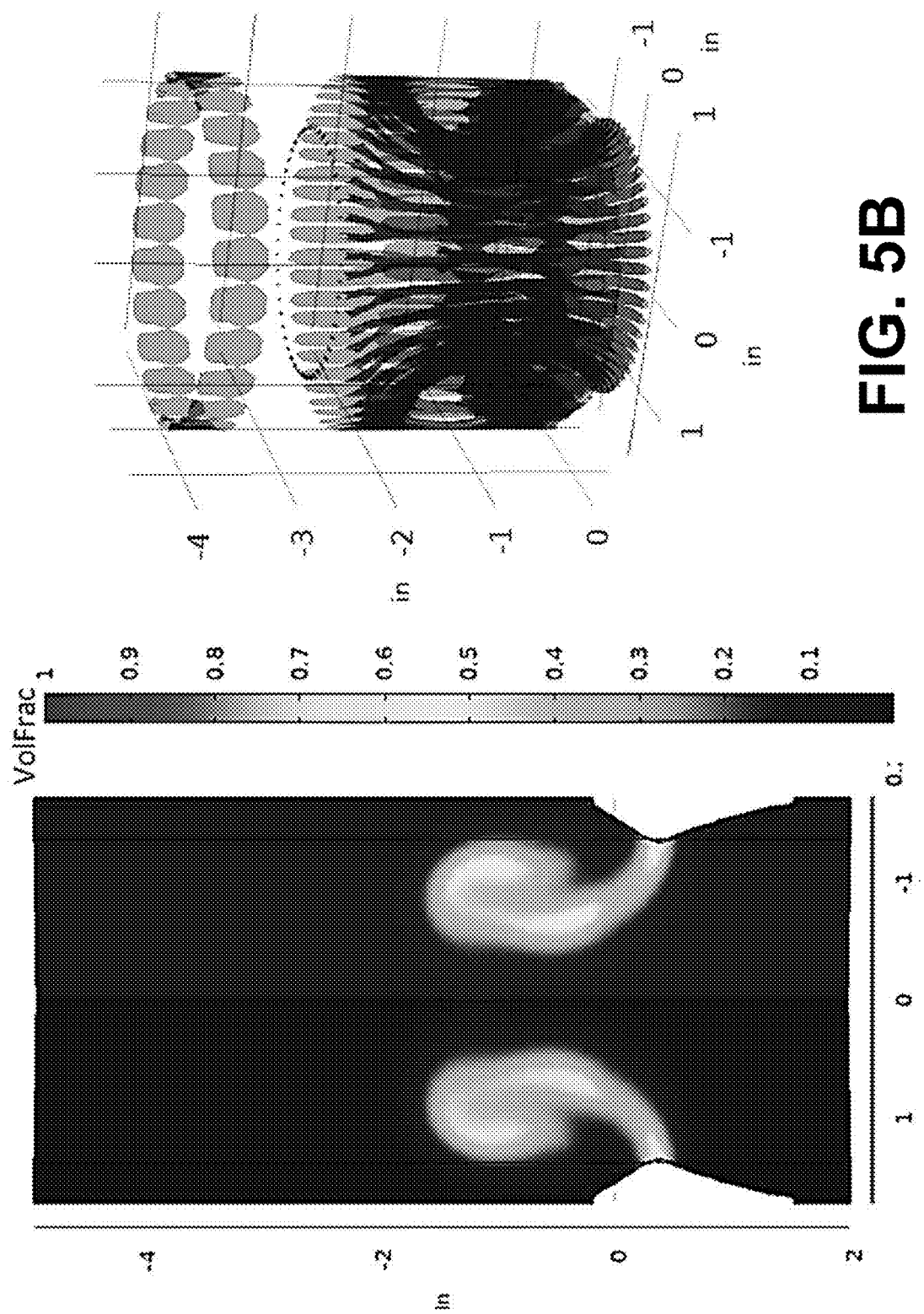
FIGS. 5A and 5B illustrate an example of simulated flow of the gas sparger head, in accordance with various embodiments of the present disclosure.

The flowrate and the bubble formation as a function of sparger geometry were analyzed with the same Multiphysics flow software that was used to optimize the internal and external geometry of the gas sparger head, as shown in FIGS. 2A-2C. FIGS. 5A and 5B illustrate the bubble formation that was simulated using COMSOL Multiphysics. FIG. 5A is a contour plot of the volume fraction of air. It is noted that the external geometry causes a pinching off of the bubble and then a subsequent drift of the bubble towards the outside of the well diameter. This desirable because the slowest moving water will be on the outer diameter of the well due to the no-slip condition. The fastest-moving water will be in the center of the pipe. FIG. 5B is a 3D illustration of the bubbles forming around the sparger head. In FIG. 5B, an isosurface is specified at a volume fraction of 0.5, which defines the bubble/water interface. Furthermore, all 50 orifices are included, and the bubble-bubble interaction is considered. It is noted that the bubbles become independent around 4 inches (−4 inches in vertical coordinates) above. These observations in the simulation were supported by the experimental results. As previously discussed, the pressure (or overpressure) at the well head can be controlled to control the bubble diameter downhole and the evolution of the bubble diameter as it rises.

Experimental Results

To aid in validating simulations and the design process, a promising sparger head design was printed using plastic. FIGS. 6A-6B illustrate the test setup of the fabricated sparger head. FIG. 6A is a photo of the multiple sparger heads that were printed out of plastic interface along a threaded pipe to for the inner stringer. FIG. 6B is the sparger head with in the test rig with a defined static water line and air flowing to the sparger. The height of the test rig was 13 feet and the inner diameter of the tube, which represents the well liner, was 3.5 inches in diameter. The test rig shown in FIG. 6B was constructed out of acrylic FIG. 6C is a photo of the top of the test rig under operation demonstrating the lift of water. Note the collection of water from the well head.

Figure 7A:
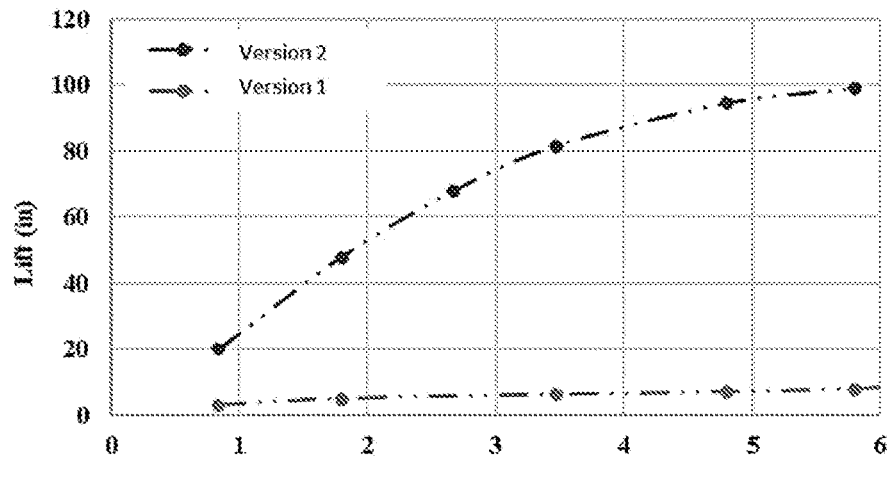
FIG. 7A-7C illustrates an example of hydraulic lift, water flow rate, and efficiency, as a function of the airflow rate of the fabricated sparger head, in accordance with various embodiments of the present disclosure.
Figure 7B:
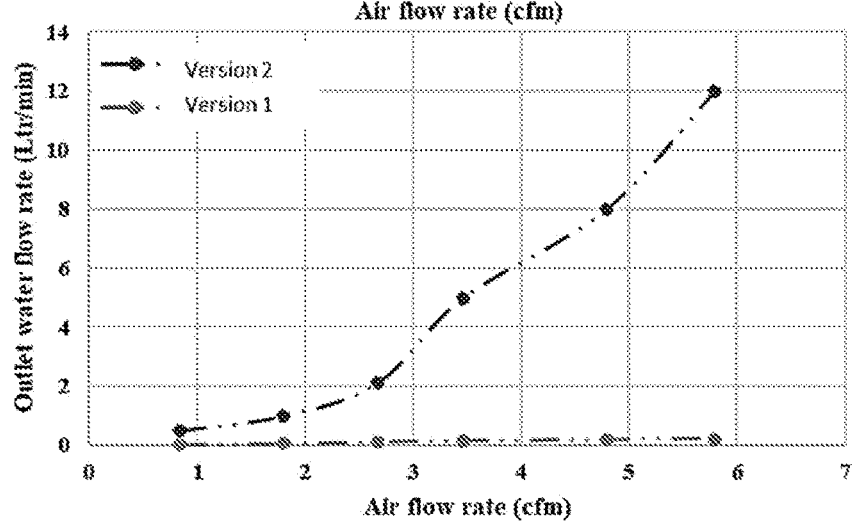
Figure 7C:
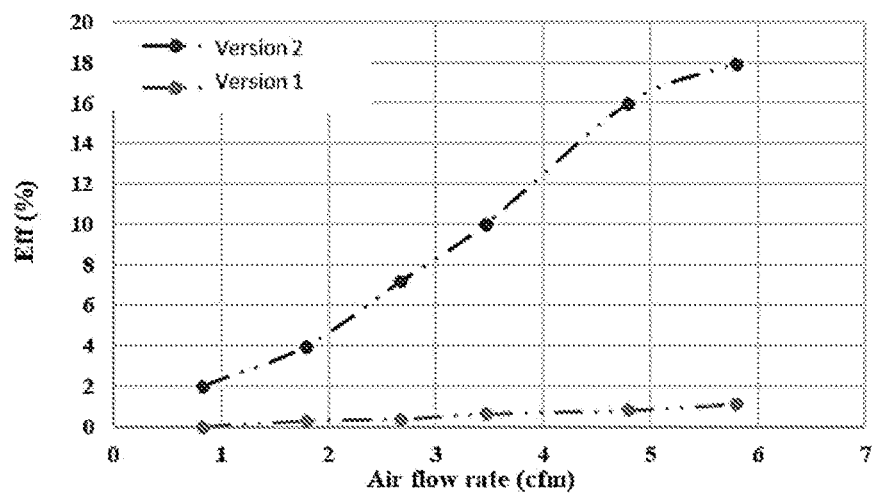

Data was taken for the fabricated sparger head printed out of plastic and metal as shown in FIG. 6B and FIG. 6D. A baseline measurement was taken by placing a tube in the absence of the sparger head at the same depth. FIG. 7 is a plot of the experimental hydraulic lift as a function of the airflow rate taken in the test rig. The optimal sparger (Version 2) was able to achieve a hydraulic lift of 100 inches with the sparger at 24 inches of depth. The baseline (no-sparger) was only able to achieve a hydraulic lift of 4 inches at 24 inches of depth at the same airflow rate. The Version 1 sparger was able to achieve 10 inches of lift. This is evidence that efficient generation of the bubbles through the gas sparger head is important to getting good lift and efficiency from the airlift system. The optimized sparger head design provided nearly nine times the lift of the baseline. From FIG. 7C is a plot of the efficiency of the sparger based on consideration of the power input at the sparge and the power out of the water, in the absence of pressure recovery of the head. An efficiency of 18% was achieved for Version 2 of the optimized sparger. The performance of the sparger head can increase with depth provided the Rayleigh-Taylor instability is not achieved (see, e.g., FIG. 14A).

Overall performance improvements come from removing the working parts of the pump from the wellbore. With the airlift system, it is hypothesized that more than a double improvement in longevity from 3 years (industry norm) to 7 years, which is the life of a compressor in continuous duty. The sparger head is projected to have more than 20 years of life because the part is small, has no moving parts, and will be made from a material resistant to corrosion, scaling, and temperature. The sparger life is more comparable to column pipe with a life of 20 years and more, and the agitation caused by the bubble flow is projected to provide some cleaning. Moreover, a sparger head can be replaced in a well far more readily than a traditional pump.

The efficiency of the airlift solution has two contributing parts, the first part is to generate bubbles and lift as efficiently as possible and the second part is to recycle the pressure head. It is believed that a pumping efficiency of 60% can be achieved, 5-6 percentage points better than existing pumps.

Figure 8:
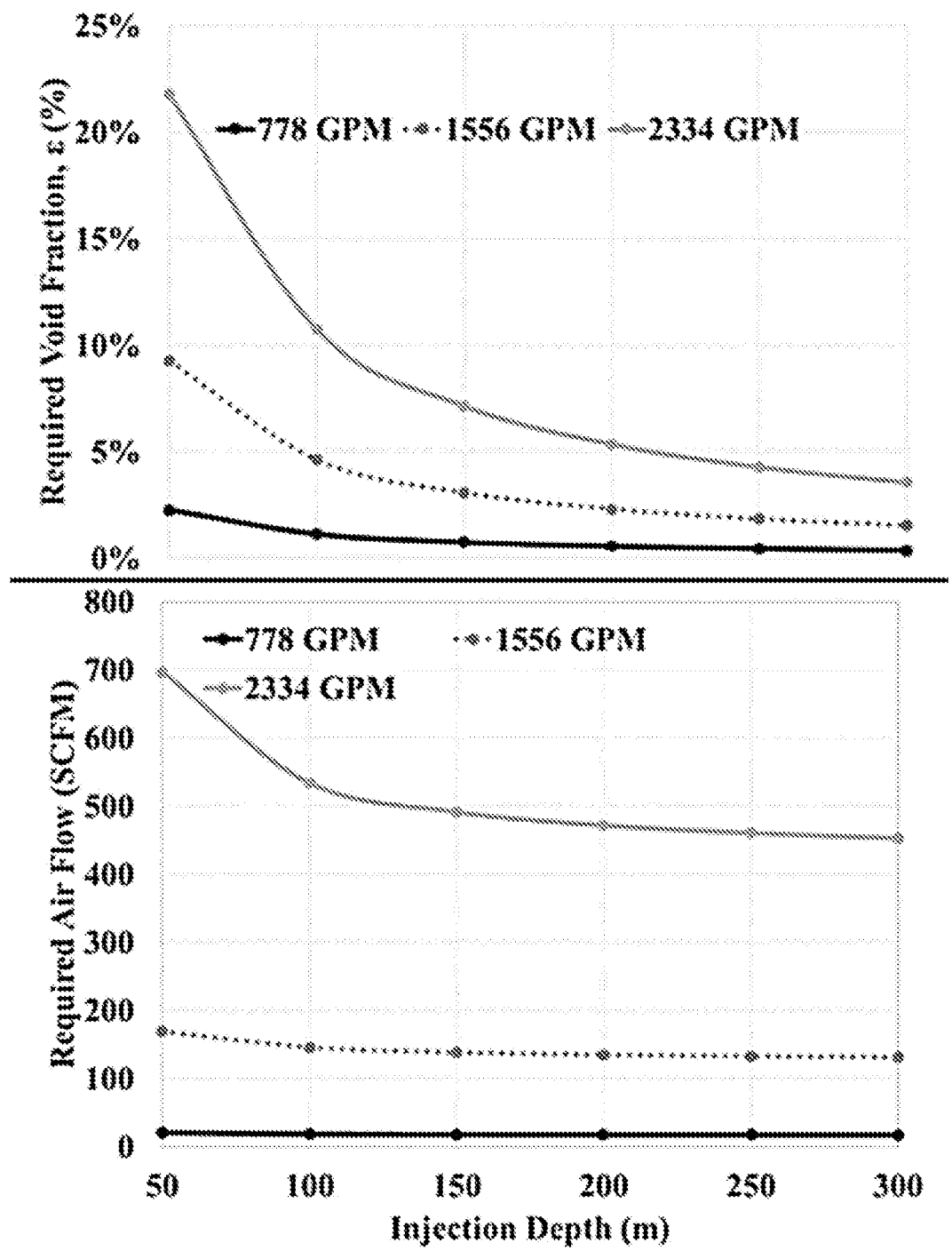
FIG. 8 illustrates an example of void fraction and gas flow rates based on water velocities and injection depths, in accordance with various embodiments of the present disclosure.
Figure 9:
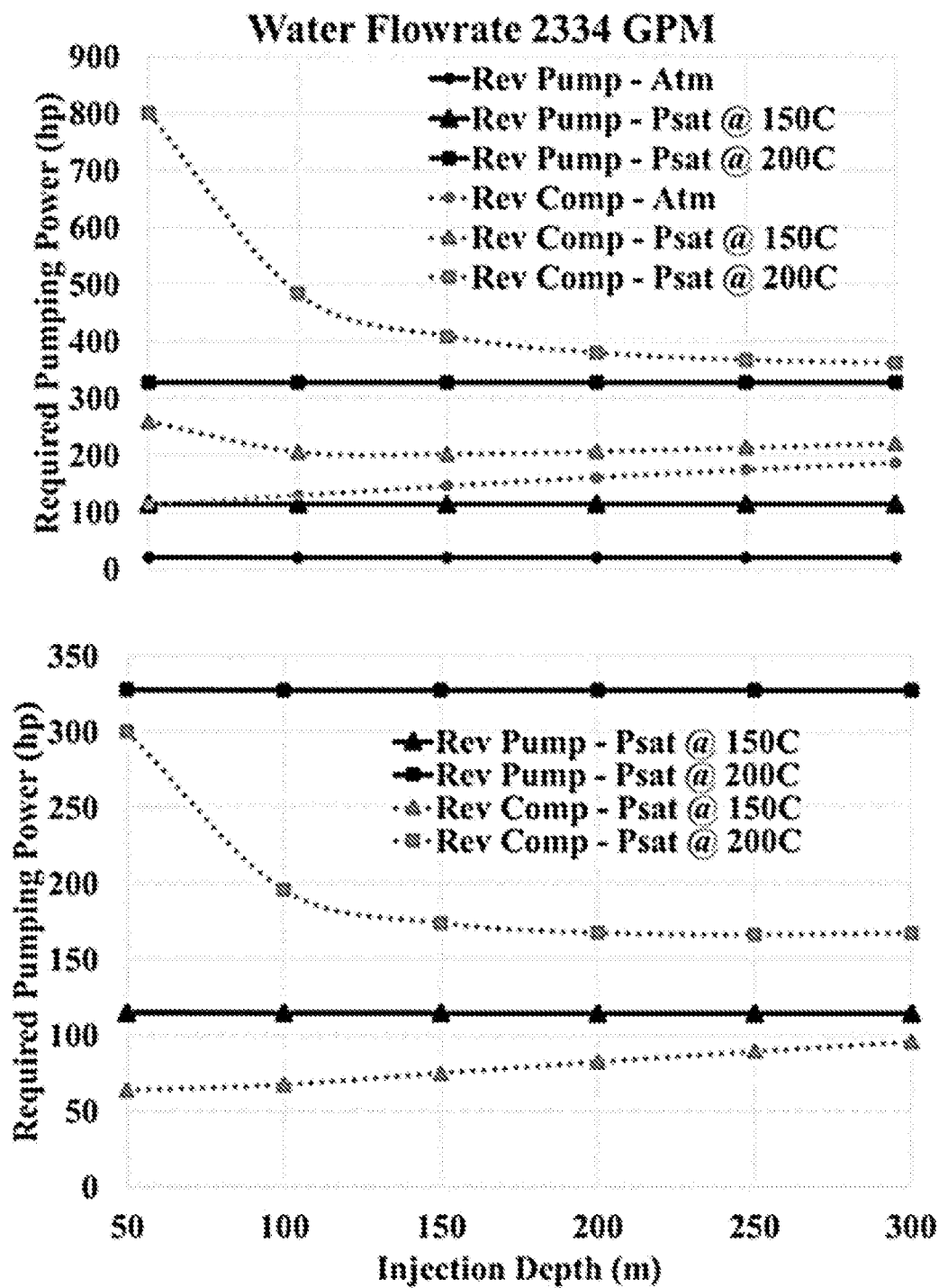
FIG. 9 illustrates an example of pumping power based on water flowrates and injection depths, in accordance with various embodiments of the present disclosure.

Current models at production scales predict that the airlift approach with an optimized sparger and pressure head recycle can exceed the efficiency of state-of-the-art turbine pumps. Pressure head recycle (from pressure head recycle assembly 121) is the use of pressure at the well surface to either make shaft power through a turbine device 133 or to simply recycle the expended pressure (the controlled pressure will be higher than the boiling pressure at the temperature of the reservoir) at the well head 106 to the intake of the compressor 109 thereby reducing the work required by the gas compressor 109. Assume a 400-meter-deep well, with a 0.25-meter bore, static water level at the surface, and permeability to draw water into the well sufficiently above the air injection point to prevent flashing. Three velocities of water were used at 1, 2, and 3 m/s and subsequently produced flows of 778, 1556, and 2334 GPM. Using typical surface roughness values, the flow friction losses were estimated, and the driving pressure balanced with the frictional losses. Void fraction and gas flow rates were based on water velocities and injection depths. FIG. 8 shows the void fraction increases with produced water and decreases with injection depth. Airflow also increases with water flow. With the flow rates of both gas and geothermal liquid, the reversible work needed by the pumping process was calculated as shown in FIG. 9. The pressure maintained at the surface (point of re-circulation of air pressure) is the saturation pressure for the temperature noted (14.7 psia for Atm, 69.1 psia for 150° C., and 225.6 psia for 200° C.). Note that the power needed for the ideal compressor is greater than the ideal turbine pump for each flow case without pressure recycle, however with pressure recycle the ideal compressor power is less than the ideal turbine pump power.

Gas Sparger Head Examples

Referring to FIGS. 10A-10B and 11A-11B, shown are examples of gas sparger heads. FIG. 10A shows cross-sectional views of a gas sparger head comprising a venturi-shaped passage extending through the sparger head. The venturi-shape includes a narrow portion where the bubble orifice is located. The tapering and curvature of the venturi-shape can be optimized as discussed to achieve a desired bubble formation and airlift pumping action. In the example of FIG. 10A, the curved venturi-shape is preceded by a linear section. The bubble orifice comprises a plurality of gas orifices radially spaced about the narrow portion of the venturi-shaped passage. Each of the plurality of gas orifices are supplied with gas (e.g., air) via a resonant chamber for formation of bubbles in the geothermal fluid. FIG. 10B illustrates the bubble orifice with a plurality of radially spaced gas orifices (e.g., 16) distributed about the gas sparger head. As shown, the gas outlet of each gas orifice is supplied via a resonant chamber, which receives air or other gas from a manifold through the gas inlet. As shown in FIG. 10B, the resonant chamber can have a spherical (or other appropriate) shape to aid in the formation of bubbles at the bubble orifice.

Figure 11A:
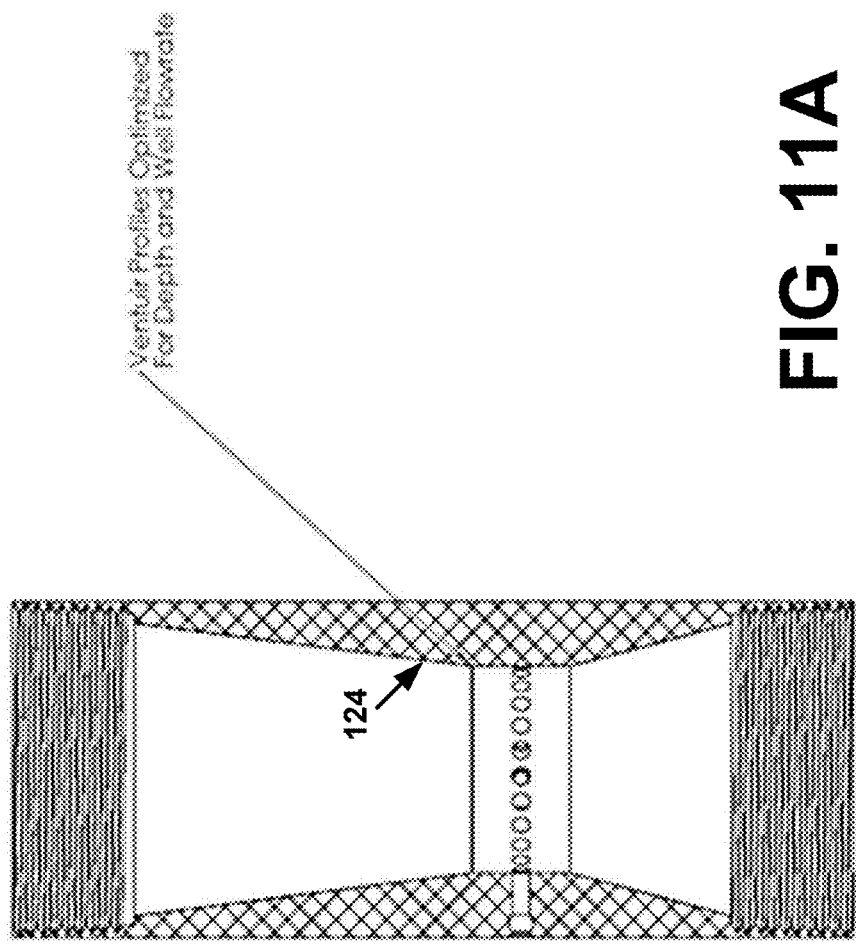
Figure 11A:
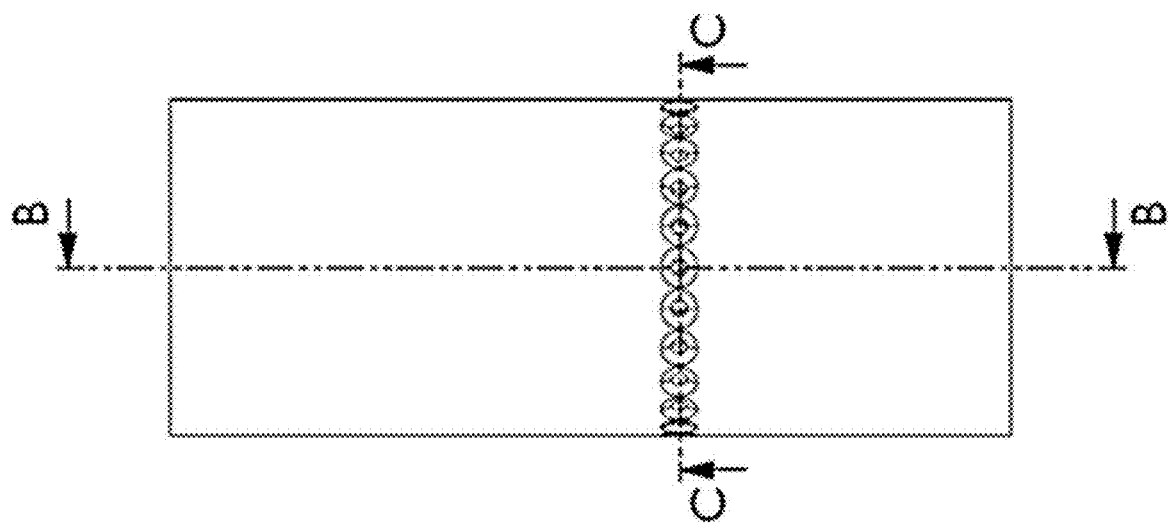
Figure 11B:
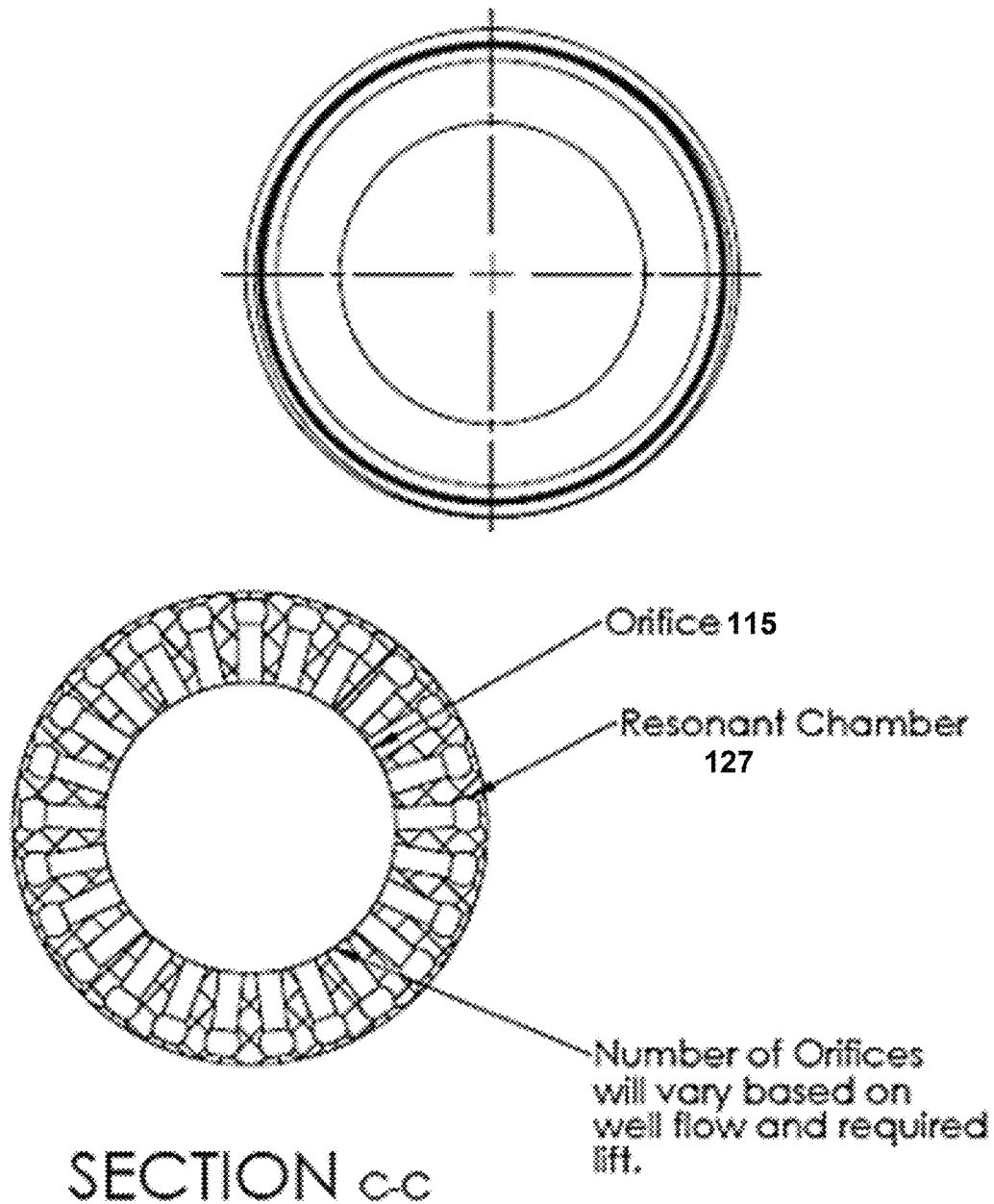

FIG. 11A shows cross-sectional views of another gas sparger head comprising a venturi-shaped passage extending through the sparger head. The venturi-shape includes a narrow portion where the bubble orifice is located with substantially linear tapering of the venturi-shape to achieve a desired bubble formation and airlift pumping action. In the example of FIG. 11A, the venturi-shape extends from the ends of the sparger head. The bubble orifice comprises a plurality of gas orifices radially spaced about the narrow portion of the venturi-shaped passage. Each of the plurality of gas orifices are supplied with gas (e.g., air) via a resonant chamber for formation of bubbles in the geothermal fluid. FIG. 10B illustrates the bubble orifice with a plurality of radially spaced gas orifices (e.g., 25) distributed about the gas sparger head. The number of gas orifices can vary depending on the well flow and desired lift. As shown, the gas outlet of each gas orifice is supplied via a resonant chamber, which receives air or other gas from a manifold through the gas inlet. As shown in FIG. 11B, the resonant chamber can have a spherical (or other appropriate) shape to aid in the formation of bubbles at the bubble orifice. This shape was optimized with the venturi parameterized (venturi throat diameter, inlet angle, and outlet angle), which allowed a more parametric study of the venturi shape.

One target application of the airlift or gas lift pump (GLP) is in enhanced geothermal systems (EGS) that have reservoir temperatures over 200° C. and at depths >2000 ft. This is an operational point where existing pumping technologies (LSP and ESP) are not currently able to operate. To enable reliable access to deeper and hotter geothermal reservoirs, an optimized sparger can be developed and deployed. The sparger of the GLP is responsible for creating the bubbles (slugs) downhole to lift the geothermal fluids to the surface. The GLP can simplify the operation and maintenance by eliminating a significant number of downhole components that can lead to failure. Applications can also include other geothermal wells, traditional wells, and anywhere water is lifted a vertical distance.

To realize the full potential of GLP (optimized pump efficiency, lift, and flow rate), the sparger head can be optimized for a given geothermal well's characteristics. A set (multiple stages) of spargers can be designed for each geothermal well. Multiple spargers can be used during an unloading process or starting of the well to gradually reduce the bottom hole pressure and the pump requirements.

FIGS. 12A and 12B are images of another design of a sparger that can be used in a gas lift system for a geothermal well application. FIG. 12A is an illustration of a gas sparger head manufactured using an additive manufacturing (AM) process (e.g., a direct metal laser sintering (DMLS) AM process). The sparger head can comprise multiple rows of orifices can be placed in a radial orientation, resulting in efficient shearing of bubbles. FIG. 12B is a photo showing the AM manufactured sparger integrated with an API 5CT L80 conventional side mandrel compared to an unmodified side mandrel.

The image of FIG. 12B shows a single optimized stainless-steel sparger that has been printed out of stainless 316L using a DMLS AM manufacturing approach. As seen in FIGS. 12A and 12B, the sparger comprises a threaded connection and a manifold. The manifold section is a difficult aspect to manufacture in the absence of an additive approach. The threaded connection is needed for the connection of a gas valve that opens and closes during the unloading process.

Figure 12C:
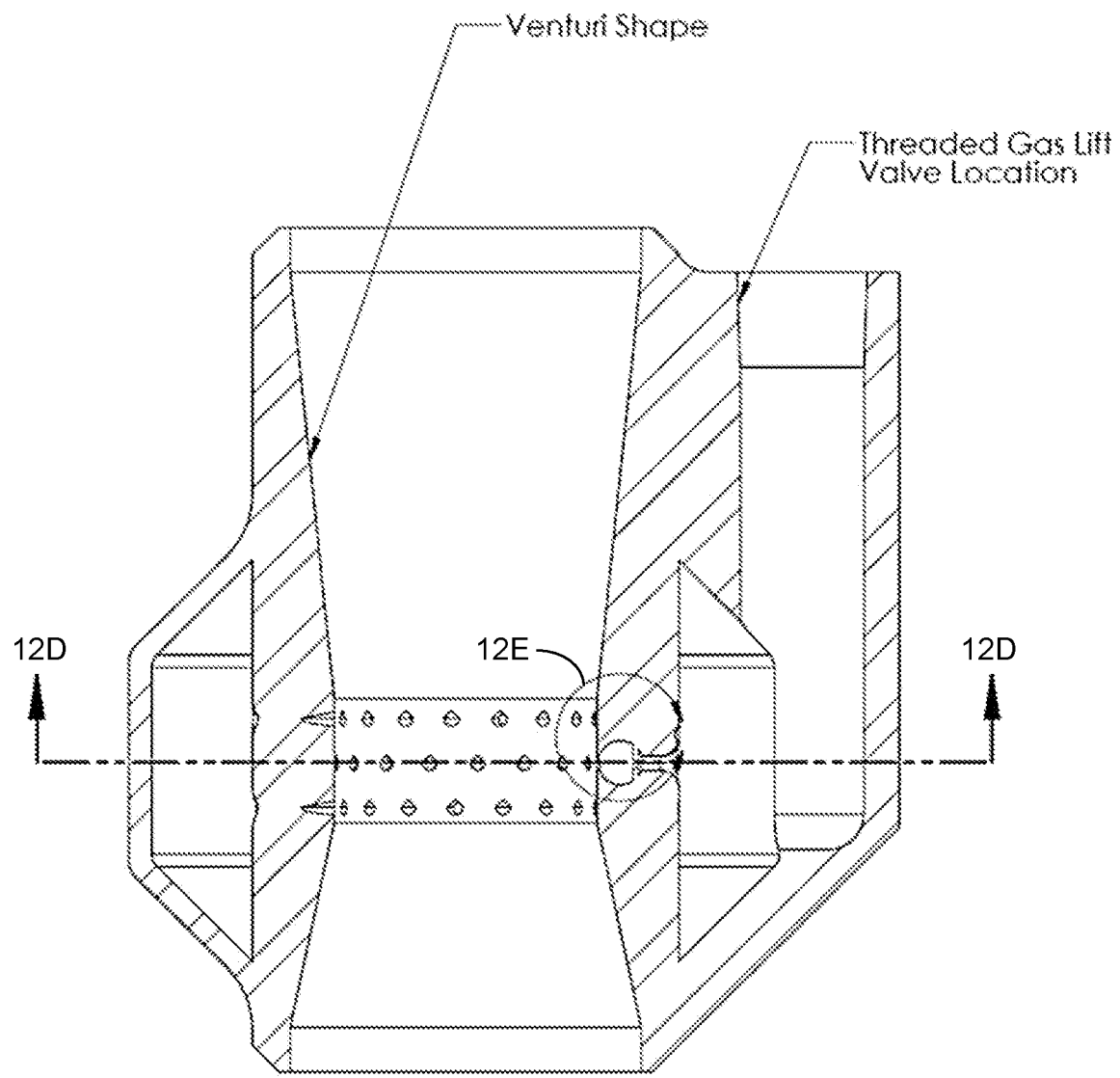

FIG. 12C shows cross-sectional view of the gas sparger head comprising a venturi-shaped passage extending through the sparger head. The venturi-shape includes a narrow portion where the bubble orifice is located. The tapering and curvature of the venturi-shape can be optimized as discussed to achieve a desired bubble formation and airlift pumping action. The bubble orifice comprises a plurality of gas orifices radially spaced about the narrow portion of the venturi-shaped passage. Each of the plurality of gas orifices are supplied with gas (e.g., air) via a resonant chamber for formation of bubbles in the geothermal fluid. FIG. 12D is a cross-sectional view illustrating the bubble orifice with a plurality of radially spaced gas orifices distributed about the gas sparger head. As shown, the gas outlet of each gas orifice is supplied via a resonant chamber, which receives air or other gas from a manifold through the gas inlet. FIGS. 12E and 12F illustrate details of an example of the resonant chamber. As shown in FIGS. 12E and 12F, the resonant chamber can have a spherical (or other appropriate) shape to aid in the formation of bubbles at the bubble orifice. The geometry adjacent to or within the resonant chamber can be optimized as previously discussed to act to control resonance of bubble release from the sparger head. In addition, internal features can be included to reduce backflow though the resonant chamber.

The sparger 103 and gas valve can be placed at several locations leading down the geothermal well 130 as illustrated in FIG. 1. Gas is pressurized in the outer annular section (outer annular area) 112 and comes in contact with the gas valve, which allows gas to enter the sparger 103. Once gas enters the manifold it is injected into the center section (venturi shaped passage) 124 through the orifice 115, producing bubbles/slugs providing lift. By passing gas in the annular section there is the added benefit of providing a thermal break to the geothermal fluid being lifted in the center section (venturi shaped passage) 124. This in turn means less heat loss and less thermal stress on the casing and concrete. Once the geothermal mixture reaches the surface, it can be sent to separation and power cycles (at pressure head recycle assembly 10F), where the pressurized gas can be recycled and reinjected into the well.

GLP operates most efficiently with a high interfacial area between the air and water, which is initially governed by sparger geometry. By designing a sparger geometry that is optimized for generating bubbles, the overall efficiency of the airlift approach can be increased. The geometry includes a combination of internal and external features, all of which can take advantage of the AM fabrication process. Sparger head internal features, which enable the resonance of the bubble generation, have very precise geometries that would be challenging to manufacture with conventional manufacturing or casting processes. Moreover, each sparger head can be tailored for given well characteristics (e.g., depth, flow, reservoir characteristics and/or multistage position).

Figure 13A:
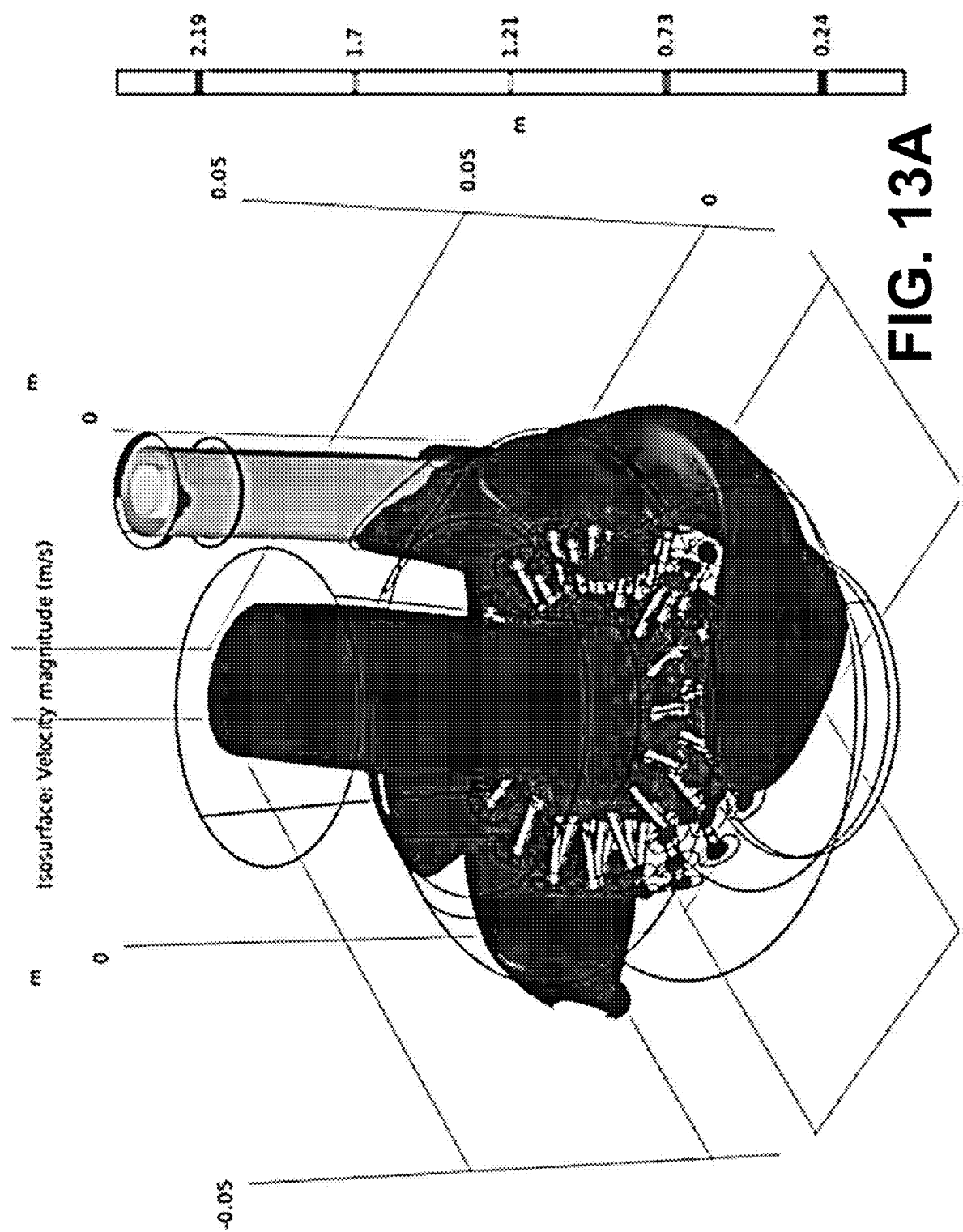
FIGS. 13A and 13B illustrate examples of simulation results of the sparger of FIGS. 12A and 12B, in accordance with various embodiment of the present disclosure.
Figure 13B:
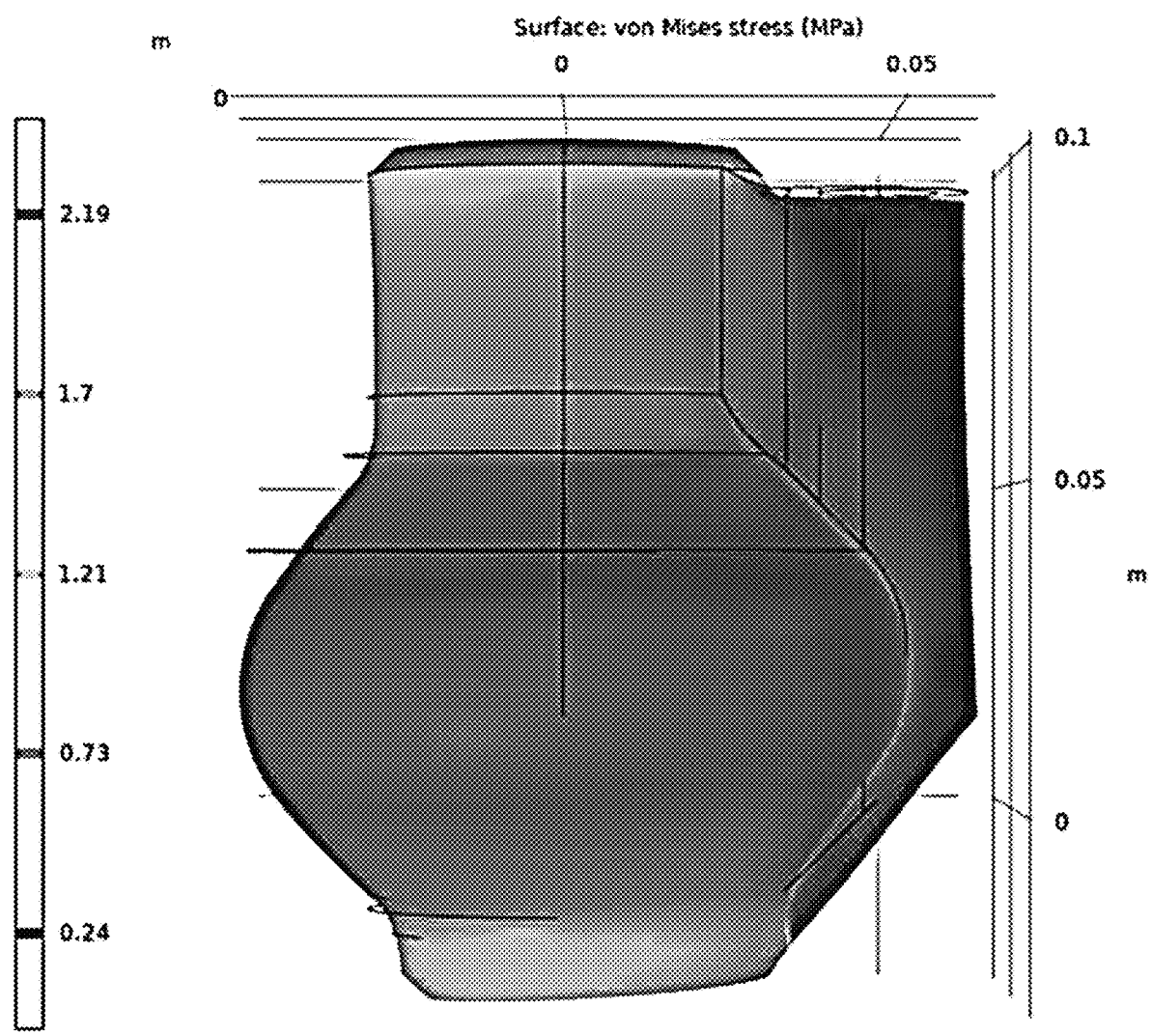

Simulation and Optimization of Sparger. Simulations of the sparger design of FIG. 12A were carried out. FIG. 13A an example of flow velocity in the sparger. Finite element simulations were used to verify the structural integrity of the 3D printed sparger. FIG. 13B is a contour plot of Von mises stress and an exaggeration of the deformation. The loading is 8 tons and the peak stresses internal to the sparger is approximately 40 MPa. The 3D printed 316L material of the sparger head has a vertical (z orientation) yield strength of 550 MPa. It is calculated that the sparger design can support up to 65 tons, which will permit deep deployment of the gas lift system. At this loading the safety of factor is 6.5 relative to the yield strength of AM stainless steel 316L in the vertical orientation.

Gas Lift Performance Testing of Sparger in Test Rig. Experiments were conducted on the sparger of FIGS. 12A and 12B at a test facility to understand the influence of submergence ratio, venturi shape, and orifice size on the overall production and efficiency of the system. Static water level was varied, and the air flow rate and water flow rate were monitored using a data acquisition system.

Figure 14A:
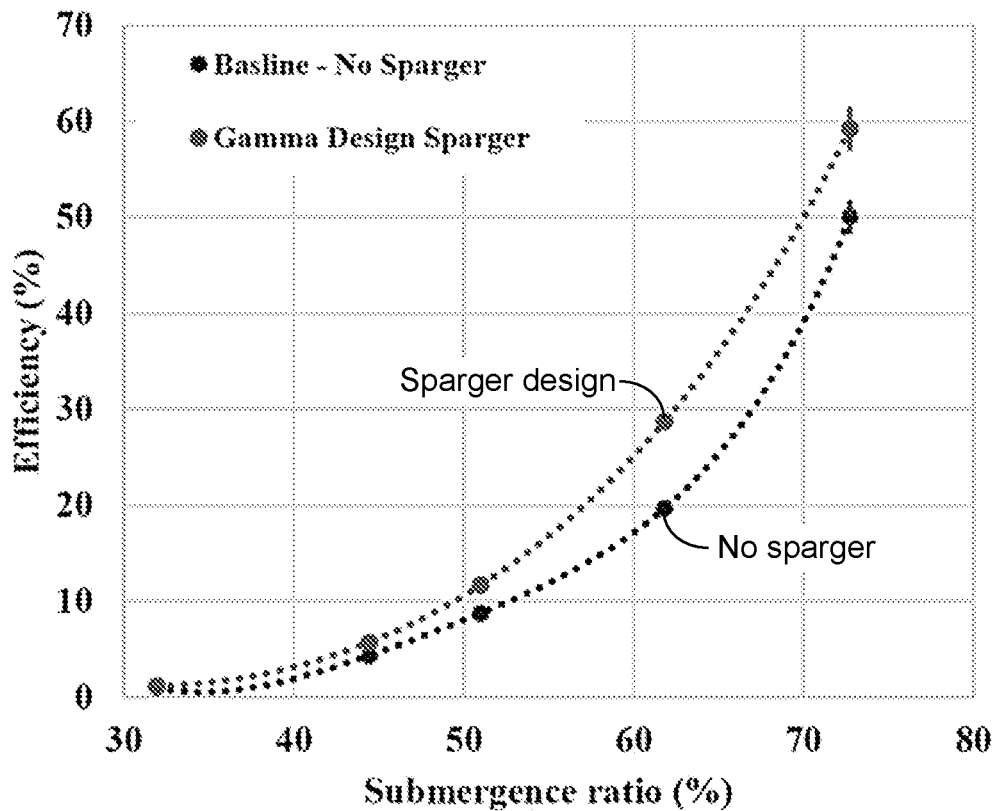
FIGS. 14A-14E illustrate examples of experimental results from performance testing of the sparger of FIGS. 12A and 12B, in accordance with various embodiment of the present disclosure.

Influence of Submergence Ratio on Performance. Submergence ratio is defined as the ratio of distance between static water line of a well and point of gas injection (sparger location) to distance from well head to sparger location. Experiments were performed for 5 different submergence ratios: 32%, 44%, 53%, 62%, and 73%. With the increase in the submergence ratio both production and efficiency were found to increase. FIG. 14A compares the efficiency calculated from the work done by the bubbles for a baseline (no sparger) and using the sparger design. The sparger increases the efficiency by 20% compared to the baseline. Also, water production increased for a higher submergence ratio than a lower one. This is beneficial for a deeper well with high submergence ratio, and can increase the production when operated at the greater depth.

Figure 14B:
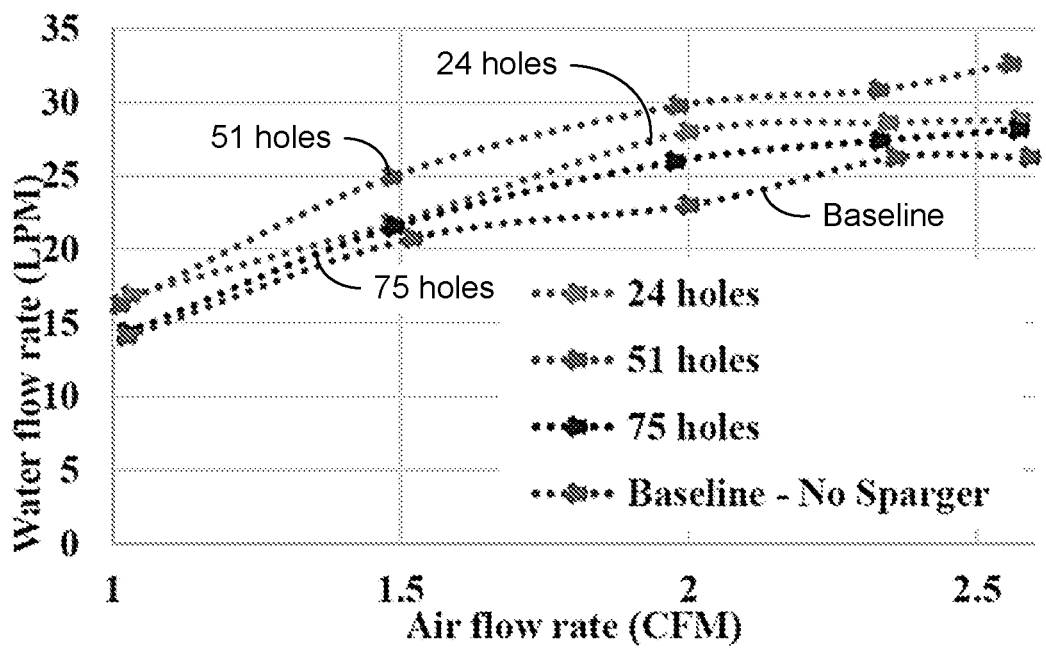

Influence of Orifice Size on Performance. For the gas lift system, size of the injected gas bubbles is an important parameter, which can be controlled by the orifice diameter. Spargers with total orifice holes of 24, 51, and 75 were tested. The total injection area for all orifices was kept constant, thus the sparger with 24 holes had a bigger orifice diameter while 75 holes had the smallest among three. It was found that a 51-hole system showed the best results. FIG. 14B is a plot illustrating the influence of the number of holes on the sparger. There is an optimal number of orifices (e.g., around 51 holes) which govern the bubble/slug formation. The production and efficiency of the baseline-no sparger case was always lower than sparger cases. Hence, injecting the gas in bulk (like the no sparger case) won't be effective and having a smaller hole isn't productive as well. So, it is beneficial for the sparger to have an orifice diameter that can inject small bubbles and not have very high-pressure loss across it.

Figure 14C:
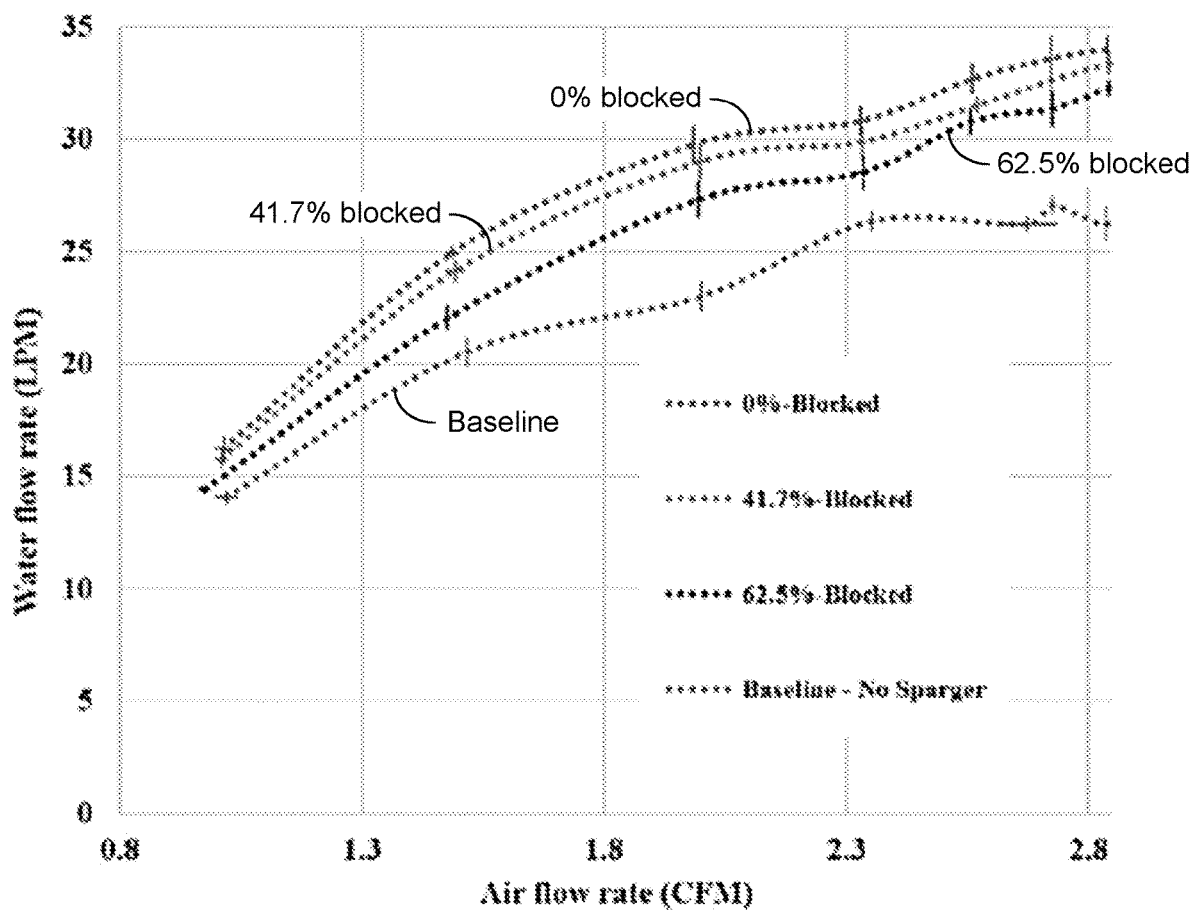
Figure 14D:
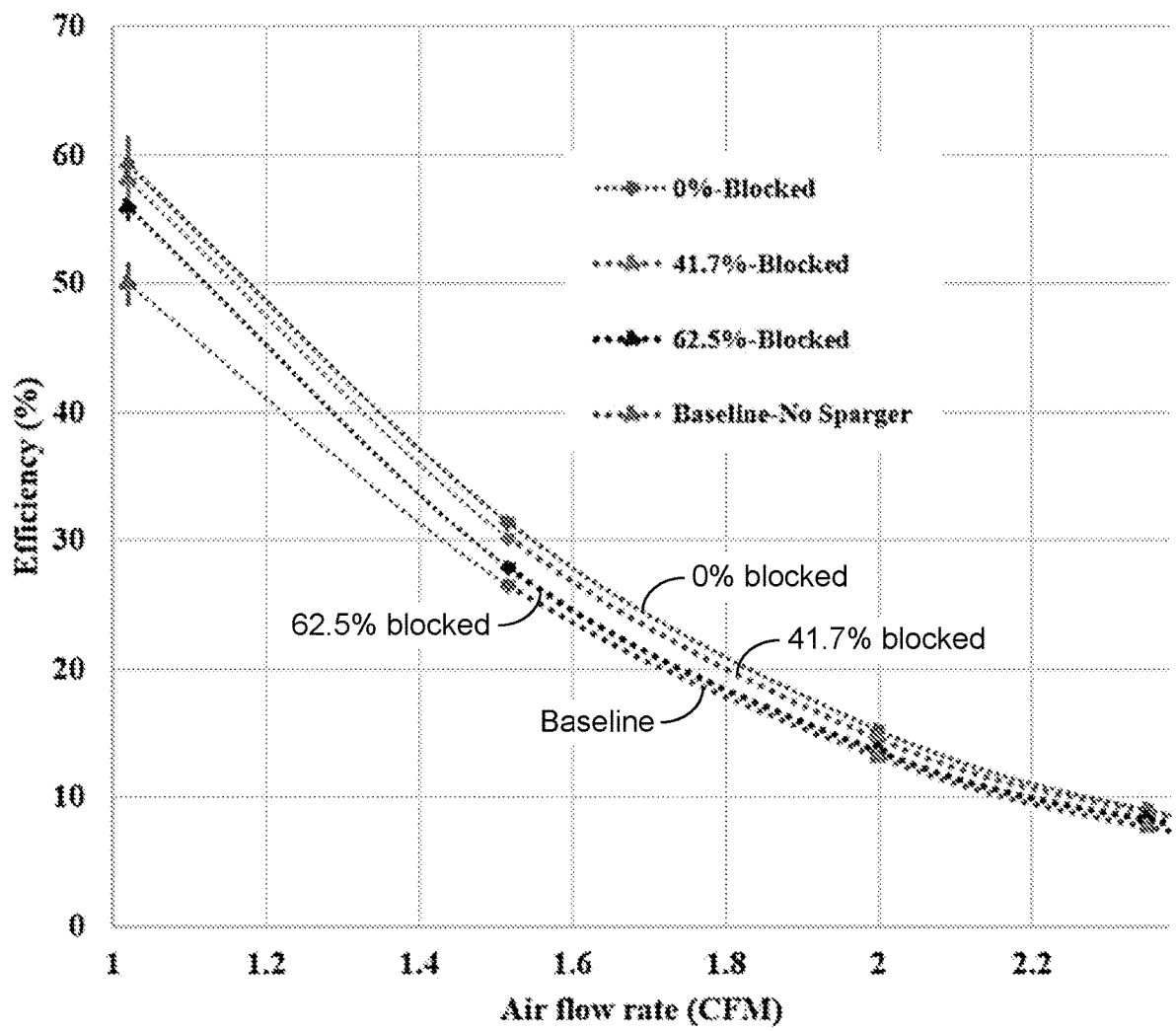

Influence of Orifice Blockage on Performance. The orifice-based gas injection is designed to withstand the extreme working environment of high temperature and pressure. Foreign element deposition in the orifice could lead to plugging of the orifice. Experiments were performed to evaluate the effect of blockage by completely blocking 41.7% and 62.5% of orifices in the sparger. FIGS. 14C and 14D depict the production and efficiency curve for different cases including no blockage (0% blockage) and the baseline case (no sparger). FIG. 14C illustrates the water flow rate and FIG. 14D illustrates the efficiency. It was found that the sparger can still operate at 80% of the non-blocked efficiency with 62.5% of holes blocked.

Figure 14E:
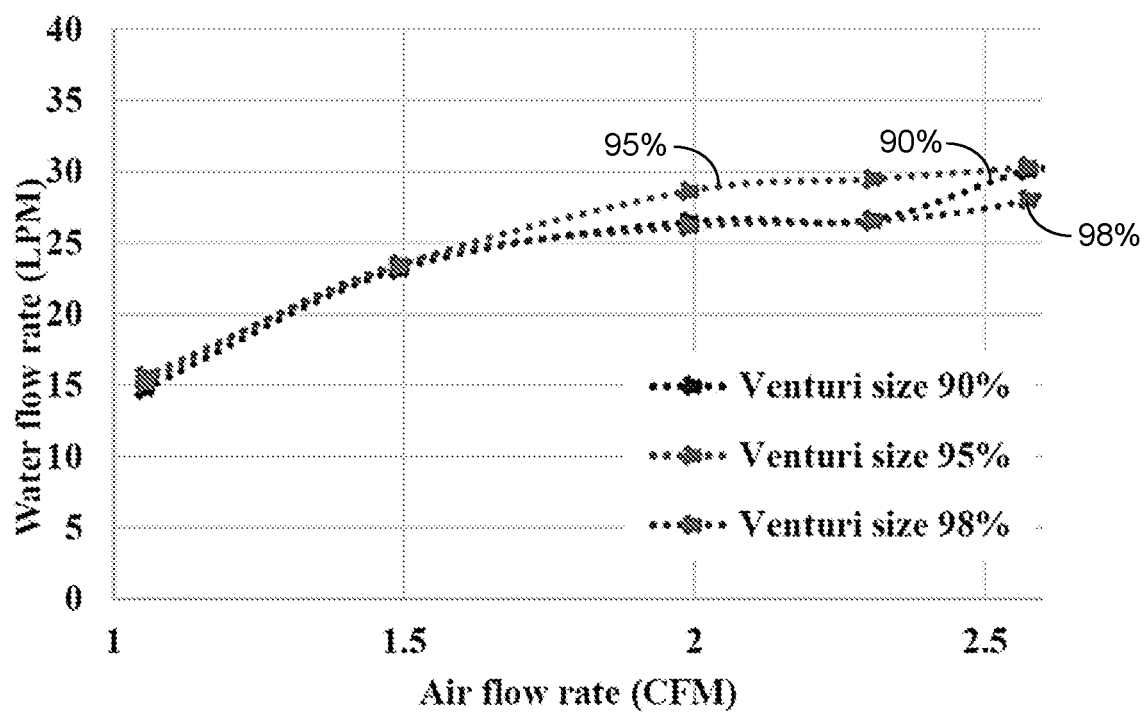

Influence of Venturi Shape on Performance. It has been proposed that a venturi shape in the sparger head will create a low-pressure zone making it conducive to inject the air from the annulus section. To validate, the venturi size was varied between 80%-98% in the tested spargers. The size of venturi was calculated with respect to the size of the production pipe. A sparger with a venturi size of 90% and 95% (a range from about 90% to about 95%) was found to show the best results. FIG. 14E illustrates that, at higher flow rates of air, the venturi has more of a performance influence on the water flow rate. The optimal venturi size was approximately 95% of the open pipe diameter with an air flow rate between 2-2.5 CFM.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. An airlift system, comprising:
a compressor;
a gas sparger head disposed in a wellbore of a geothermal well, the gas sparger head comprising:
  a venturi shaped passage extending through the gas sparger head; and
  a bubble orifice comprising a plurality of gas orifices radially spaced about a narrow portion of the venturi shaped passage, each of the plurality of gas orifices having a corresponding resonant chamber through which air from the compressor is provided, wherein the corresponding resonant chambers are spherical; and
a pressure head recycle assembly configured to extract air discharged by the bubble orifice at a well head of the geothermal well and supply the extracted air to the compressor or to a turbine to make shaft power.

2. The airlift system of claim 1, wherein the gas sparger head comprises a linear string of spargers along a central pipe to distribute the air supplied by the compressor to each of the plurality of gas orifices through the corresponding resonant chamber.

3. The airlift system of claim 1, wherein the gas sparger head comprises a threaded or welded connection at its top and bottom.

4. The airlift system of claim 3, wherein multiple gas sparger heads are placed along a concentric pipe arrangement.

5. The airlift system of claim 3, wherein the air from the compressor is fed on an outer annular area of a concentric tube arrangement and an air/water bubbly mixture is within an inner tube of the concentric tube arrangement.

6. The airlift system of claim 5, wherein the outer annular area of the concentric tube arrangement acts as a manifold configured to provide the air from the compressor to the plurality of gas orifices with an even distribution of pressure.

7. The airlift system of claim 1, wherein an orifice plate is used to control resonance release of bubbles from the gas sparger head.

8. The airlift system of claim 1, wherein down hole bubble diameter is controlled at least in part by controlling pressure at the well head.

9. The airlift system of claim 8, wherein evolution of the down hole bubble diameter through the wellbore is based upon the pressure at the well head.

10. The airlift system of claim 1, wherein the gas sparger head is located above a perforated liner in the geothermal well.

11. The airlift system of claim 1, wherein the air from the compressor is supplied from the compressor through a concentric air feed extending along a length of the geothermal well.

12. The airlift system of claim 1, comprising a plurality of gas sparger heads distributed along a length of the geothermal well.

13. The airlift system of claim 1, wherein operation of the airlift system is controlled via bore pressure and density.

14. The airlift system of claim 1, wherein an overall pumping efficiency of the airlift system is at least 60%.

* * * * *